(12) United States Patent
Guy

(10) Patent No.: US 11,922,698 B2
(45) Date of Patent: Mar. 5, 2024

(54) SYSTEM, APPARATUS, AND METHOD FOR MONITORING EDGE COMPUTE SITES

(71) Applicant: RF Code, Inc., Austin, TX (US)

(72) Inventor: Jonathan Andrew Guy, Austin, TX (US)

(73) Assignee: RF Code, Inc., Austin, TX (US)

( * ) Notice: Subject to any disclaimer, the term of this patent is extended or adjusted under 35 U.S.C. 154(b) by 0 days.

(21) Appl. No.: 18/111,743

(22) Filed: Feb. 20, 2023

(65) Prior Publication Data

US 2023/0267745 A1  Aug. 24, 2023

Related U.S. Application Data

(60) Provisional application No. 63/312,273, filed on Feb. 21, 2022.

(51) Int. Cl.
*G06V 20/52* (2022.01)
*G06T 7/194* (2017.01)
(Continued)

(52) U.S. Cl.
CPC .............. *G06V 20/52* (2022.01); *G06T 7/194* (2017.01); *G06T 7/70* (2017.01); *G06T 7/90* (2017.01);
(Continued)

(58) Field of Classification Search
CPC .. G06V 20/52; G06V 10/60; G06V 30/18105; G06V 2201/07; G06T 7/194; G06T 7/70; G06T 7/90; G06T 2207/10048
See application file for complete search history.

(56) References Cited

U.S. PATENT DOCUMENTS

| 3,651,695 A | 3/1972 | Brown |
| 4,149,394 A | 4/1979 | Sornes |

(Continued)

FOREIGN PATENT DOCUMENTS

| EP | 3285238 A2 | 2/2018 |
| EP | 3767060 A1 | 1/2021 |

(Continued)

OTHER PUBLICATIONS

Invitation to Pay Additional Fees dated May 4, 2023, in connection with International Application No. PCT/US2023/013421, 2 pages.

(Continued)

*Primary Examiner* — John B Strege

(57) ABSTRACT

Systems, methods, and devices are described for monitoring and protecting electronic hardware, data assets, and the facility itself, particularly well-suited to monitoring remote facilities and resources in edge locations, including for determining door state for both equipment and personnel doors, and for determining values of one or more environmental parameters, using optical image analytics. An example system includes one or more edge-located hardware monitoring devices having one or more physical sensors, and custom software distributed across edge, cloud, mobile, and enterprise platforms. An example monitoring device can include an embedded computer, various sensors of different types, one or more cameras, a power supply, and several communication interfaces. All or virtually all sensing and processing capabilities can be integrated into the edge device, which utilizes low-cost sensors and video analytics to monitor the environment.

25 Claims, 15 Drawing Sheets

(51) Int. Cl.
   *G06T 7/70* (2017.01)
   *G06T 7/90* (2017.01)
   *G06V 10/60* (2022.01)
   *G06V 30/18* (2022.01)

(52) U.S. Cl.
   CPC ........ *G06V 10/60* (2022.01); *G06V 30/18105* (2022.01); *G06T 2207/10048* (2013.01); *G06V 2201/07* (2022.01)

(56) References Cited

U.S. PATENT DOCUMENTS

| | | | |
|---|---|---|---|
| 5,612,524 | A | 3/1997 | Sant'Anselmo et al. |
| 5,825,015 | A | 10/1998 | Chan |
| 7,181,066 | B1 | 2/2007 | Wagman et al. |
| 8,672,149 | B2 | 3/2014 | Knight |
| 8,837,954 | B2 | 9/2014 | Primm et al. |
| 9,247,131 | B2 | 1/2016 | Kostrzewa et al. |
| 9,342,724 | B2 | 5/2016 | McCloskey et al. |
| 9,659,202 | B2 | 5/2017 | Kamijo et al. |
| 9,671,292 | B2 | 6/2017 | Wei et al. |
| 9,704,086 | B2 | 7/2017 | Primm et al. |
| 10,074,227 | B1 * | 9/2018 | Berenberg ......... G07C 9/00904 |
| 10,123,051 | B2 | 11/2018 | Laganiere et al. |
| 10,864,927 | B2 * | 12/2020 | Ohki .................... H04N 23/61 |
| 2003/0218542 | A1 * | 11/2003 | Barendt ................. H04N 7/181 348/E7.086 |
| 2005/0074142 | A1 * | 4/2005 | Ertl .................... B60R 21/01538 382/104 |
| 2007/0080234 | A1 | 4/2007 | Domoy |
| 2015/0281666 | A1 | 10/2015 | Chen et al. |
| 2016/0092719 | A1 | 3/2016 | Xue et al. |
| 2017/0050652 | A1 * | 2/2017 | Beyer .................... H04N 7/181 |
| 2017/0200035 | A1 | 7/2017 | Teraura |
| 2019/0057409 | A1 | 2/2019 | Omer et al. |
| 2019/0327826 | A1 | 10/2019 | Chang et al. |
| 2019/0342974 | A1 | 11/2019 | Hromin et al. |
| 2020/0160129 | A1 | 5/2020 | Fan et al. |
| 2022/0005332 | A1 | 1/2022 | Metzler et al. |
| 2022/0020176 | A1 | 1/2022 | Hillman |

FOREIGN PATENT DOCUMENTS

| | | |
|---|---|---|
| JP | H0971240 A | 3/1997 |
| JP | 2017138134 A | 8/2017 |
| WO | 2019206130 A1 | 10/2019 |

OTHER PUBLICATIONS

International Search Report and Written Opinion of the International Searching Authority dated Aug. 3, 2023, in connection with International Application No. PCT/US2023/013421, 12 pages.

Milgrom, Benjamin, et al., "Novel approach for extending the depth of field of Barcode decoders by using RGB channels of information", Optics Express 17027, Aug. 2, 2010, 13 pages, vol. 18, No. 16, Optical Society of America.

Non-final Office Action dated Dec. 13, 2023, in connection with U.S. Appl. No. 18/372,831, 13 pages.

* cited by examiner

SYSTEM, APPARATUS, AND METHOD FOR MONITORING EDGE COMPUTE SITES

CROSS-REFERENCE TO RELATED APPLICATIONS

This application claims the benefit of U.S. Provisional Application No. 63/312,273, filed on Feb. 21, 2022, entitled SYSTEM, APPARATUS, AND METHOD FOR MONITORING EDGE COMPUTE SITES, the contents of which are incorporated by reference herein in their entirety.

TECHNICAL FIELD

This disclosure relates generally to monitoring physical and environmental aspects of compute facilities, particularly using an optical camera and image analytics, and more particularly for edge compute sites.

BACKGROUND

With the ever-increasing popularity of cloud-based computer systems and applications hosted on such cloud-based systems, there is increasing demand for servers and networking equipment. Typically, servers and network equipment are housed in racks. Often servers and network equipment are maintained in large data center facilities including dozens or hundreds of racks, each housing dozens of equipment items.

However, recent trends indicate that an increasing percentage of enterprise generated data comes from outside of traditional cloud computing centers. Many of these non-cloud computing centers include distributed compute and data storage and are commonly referred to by industry as edge locations, or "the Edge." Examples include the data closets found in retail stores, offices, hospitals, and factories.

Edge locations (also known as edge sites) can be critical to the operation of the facility. Compromise to the equipment or data has immediate impact on business operations as well as long term disruption if data is stolen or assets are unaccounted for. Edge locations may have a wide range of devices, which additionally may not be uniform from site to site. Equipment at the edge may include servers, storage arrays, network switches, rack hardware, uninterruptible power supplies, cooling equipment and other devices specific to the operation of that facility.

In many cases, edge locations are protected only by a lock and key, or by mere office-grade access control systems. In smaller buildings the data closet will often serve other purposes, include building-service equipment and storage, and may be legitimately accessed by individuals who are not responsible for the equipment nor tasked with monitoring the equipment. Threats can include theft of hardware or data, physical hacking, water damage, power loss, and cooling issues. Most commonly these locations are 'lights-out', meaning no personnel are immediately present to monitor the assets. Where personnel are present, they are likely to be unskilled in repair and maintenance of computer equipment.

A camera may be installed to monitor a lights-out edge location. Such a camera is typically part of a security system, and is either monitored in real-time by a person, or video footage is recorded for future review. Typically such cameras may detect events, such as motion, to trigger recording and issue alerts.

High operating temperature is a threat to electronic equipment. Such equipment generates considerable thermal energy and will overheat if cooling is insufficient. Due to variances in equipment, airflow, and other parameters, it is sometimes necessary to monitor temperature at multiple locations. Certain industry practices specify monitoring at the top, middle, and bottom of each rack. Temperature monitoring therefore can require multiple sensors, either wired or wireless, or a thermal imaging camera. Each of these options is costly in terms of equipment, installation, and maintenance. Wireless temperature sensors are widely used in data centers to monitor rack temperature. These sensors are flexible but require periodic battery replacement, and also are vulnerable to damage when racks are moved or new equipment is installed.

Water leaks are another threat to electronic equipment. Sources include plumbing leaks, sprinkler system problems, roof leaks, and condensation from HVAC systems. Leaks often go undetected as they may be at unmanned (lights-out) sites or may be intermittent. Electronic water detection sensors, either wired or wireless, are often used to detect leaks near electronic equipment. Due to their high cost, such sensors are often not installed, or only installed in a few locations. Battery life is also an issue, and periodic maintenance and replacement is required.

These issues present significant opportunities for improved and lower cost systems, methods, and devices for monitoring and protecting computer equipment and data, including monitoring physical access, monitoring temperature at multiple locations, and detecting liquid leaks and moisture, while being sufficiently flexible for other business operations.

SUMMARY OF CERTAIN EMBODIMENTS

Disclosed herein are systems, methods, and devices for monitoring and protecting electronic hardware, data assets, and the facility itself. Such disclosed techniques are particularly well suited to monitoring remote facilities and resources in edge locations, but are nonetheless still suitable for other facilities as well.

In one aspect, an example system includes one or more edge-located hardware monitoring devices, one or more additional physical sensors, and custom software distributed across edge, cloud, mobile, and enterprise platforms.

An example monitoring device can include an embedded computer, various sensors, one or more cameras, a power supply, and several communication interfaces. Such a monitoring device can both detect and predict issues that could compromise computer operation. In embodiments, all or virtually all sensing and processing capabilities can be integrated, utilizing low-cost sensors and video analytics to monitor the environment.

In some embodiments, the monitoring device can provide for reliably monitoring one or more physical and/or environmental attributes of the edge location and equipment therein, using a standard camera and low-cost sensor strips attached to surfaces in and around the equipment. Such attributes can include the open/closed state of one or more doors, the temperature of the equipment in multiple locations, and the presence of water or moisture near equipment. No electronic sensor installation is needed, reducing sensor cost as well as installation and maintenance costs, and improving the reliability. Additionally, in certain embodiments such a monitoring device can operate autonomously without network connectivity so that protection is maintained even in anomalous conditions.

While particularly directed at edge computing environments, such systems, methods, and monitoring devices are also applicable to facilities such as large data centers and other environments.

BRIEF DESCRIPTION OF THE DRAWINGS

For a more complete understanding of the present disclosure and its advantages, reference is now made to the following description taken in conjunction with the accompanying drawings, in which like reference numerals represent like parts. However, these drawings illustrate only some of the embodiments and therefore are not to be considered limiting in scope. Moreover, any particular drawing may illustrate examples or features in accordance with more than one embodiment.

DETAILED DESCRIPTION

The non-limiting examples depicted in the appended FIGURES and the various embodiments discussed herein are by way of illustration only and should not be construed in any way to limit the scope of any invention described herein.

Door State Detection

Access monitoring is frequently an important role in security monitoring systems. Various embodiments are disclosed which provide for reliably monitoring the opening and closing of doors using video analytics. One or more doors can be monitored with a single system, and no additional sensor installation is needed. The described example systems reduce or eliminate training data for new environments.

Security systems commonly use cameras which are either monitored in real-time by a person, or video footage is recorded for future review. Cameras may detect events, such as motion, to trigger recording and issue alerts. Video analytics employs trained models and AI to detect significant events. Video analytics may be performed using computers at a remote location, such as a cloud-service, or using local or integrated processors. The latter is commonly referred to as the edge.

Video analytic models can be developed to detect when a door is open or closed. Door activity can be used directly or correlated to other events that might indicate a security issue. Doors are most commonly for entry and egress but are also important as access panels for building services and for doors on equipment such as server racks. Server rack doors are important not only for security but can impact equipment cooling if they are left open.

Additionally, it is also desirable to be able to detect the degree to which a door in open. Measuring the distance or angle to which a door is open provides additional information on the severity of the open door.

Video analytics for door states work well in controlled environments, especially those that are close to the training models. In practical deployment, lighting, surface finishes and viewing angles often result in unreliable detection. Site-specific training helps mitigate variances but carries additional cost to the installer.

Therefore, there is the need for a video analytics system that can track door position and does not use models or methods that require optimization to a range of site configurations.

Figure 1:
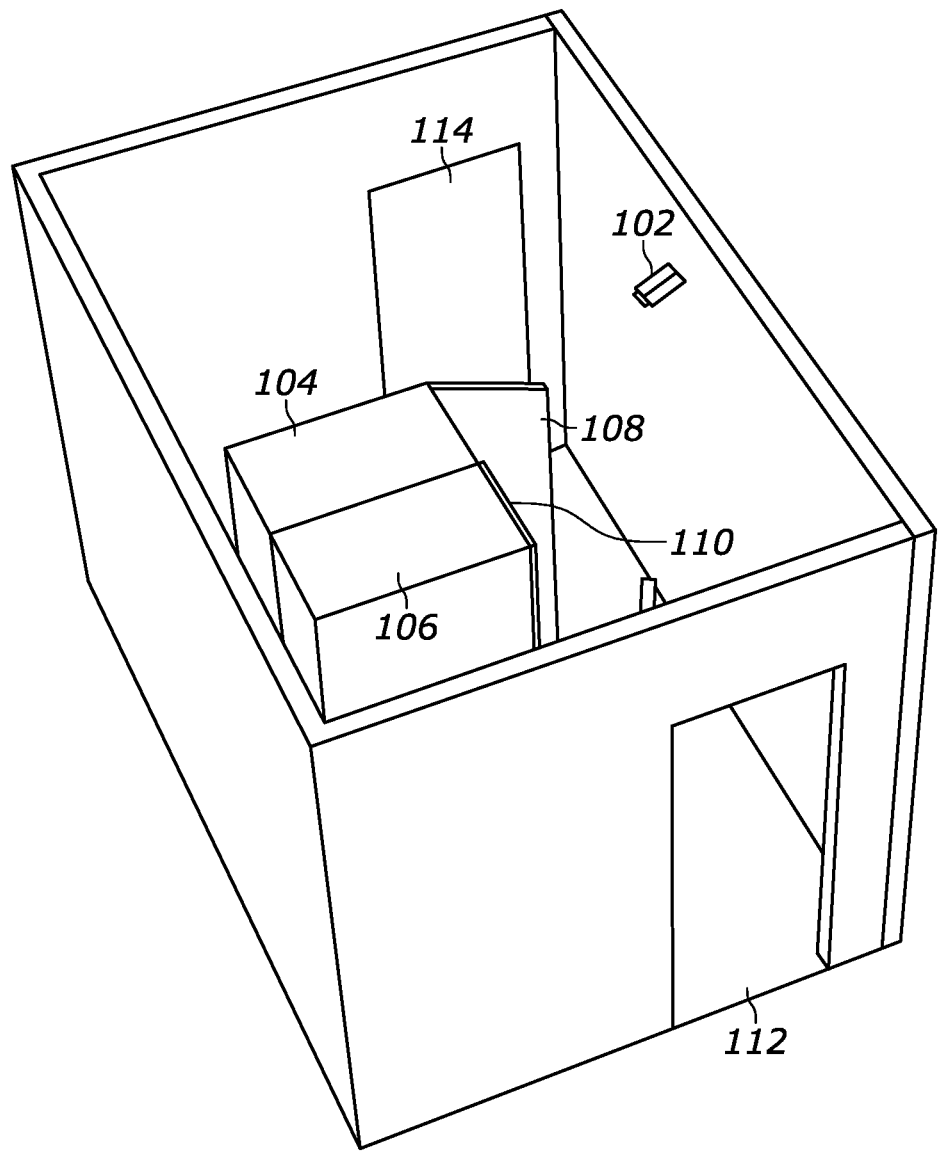
FIG. 1 illustrates an example data closet with a video analytics camera.

Referring now to FIG. 1, a cut-away view of an example data closet 100 is shown, with a camera 102 positioned to monitor the data closet 100. The data closet 100 has two server racks 104, 106 with respective rack doors 108, 110, and two entry doors 112, 114 providing personnel access to the data closet 100. In embodiments, two tracking strips are installed at each door, as further described below. One tracking strip is fixed and located on the door frame, while the other tracking strip is mounted on the door itself. All tracking strips should be in-view of the camera 102, at least when the door is open.

Figure 2:
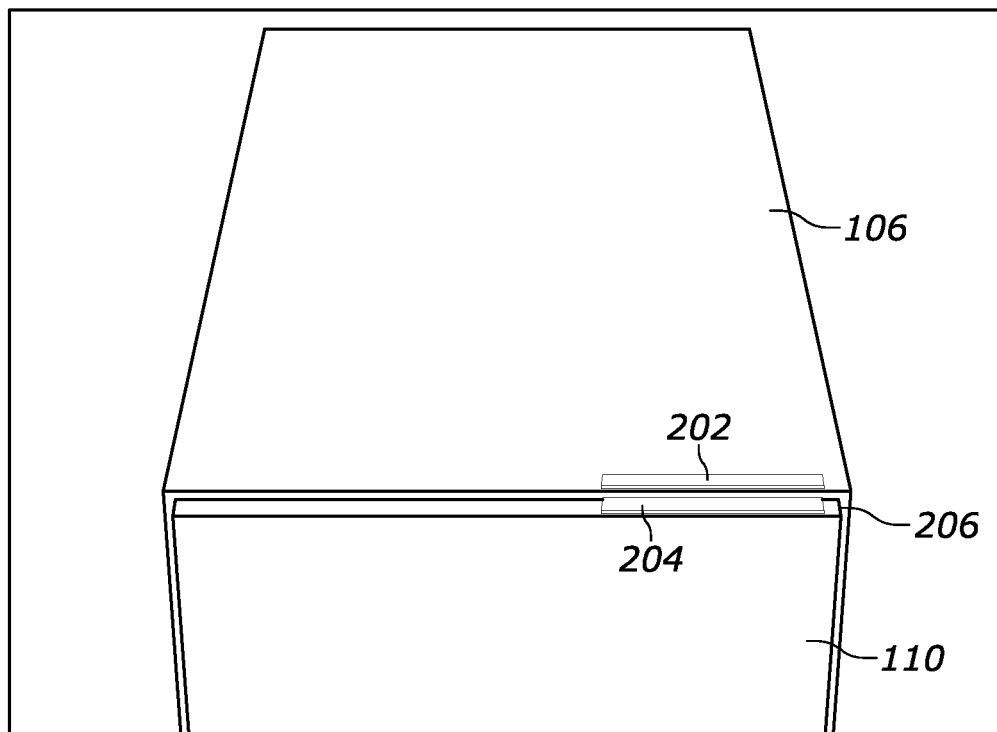
FIG. 2 illustrates parallel tracking strips indicating a door is closed.

Referring now to FIG. 2, a view of the server rack 106 is shown, with two tracking strips 202, 204 installed. The first tracking strip 202 is mounted on the frame of the rack 106, while the second tracking strip 204 is mounted on the rack door 110. The two tracking strips 202, 204 are preferably mounted so that they are parallel to each other when the rack door 110 is closed, and also are preferably mounted close to the hinge 206 to allow analytics software to maintain the association of the tracking strip 202 with the tracking strip 204 regardless of the position of door 110.

Figure 3:
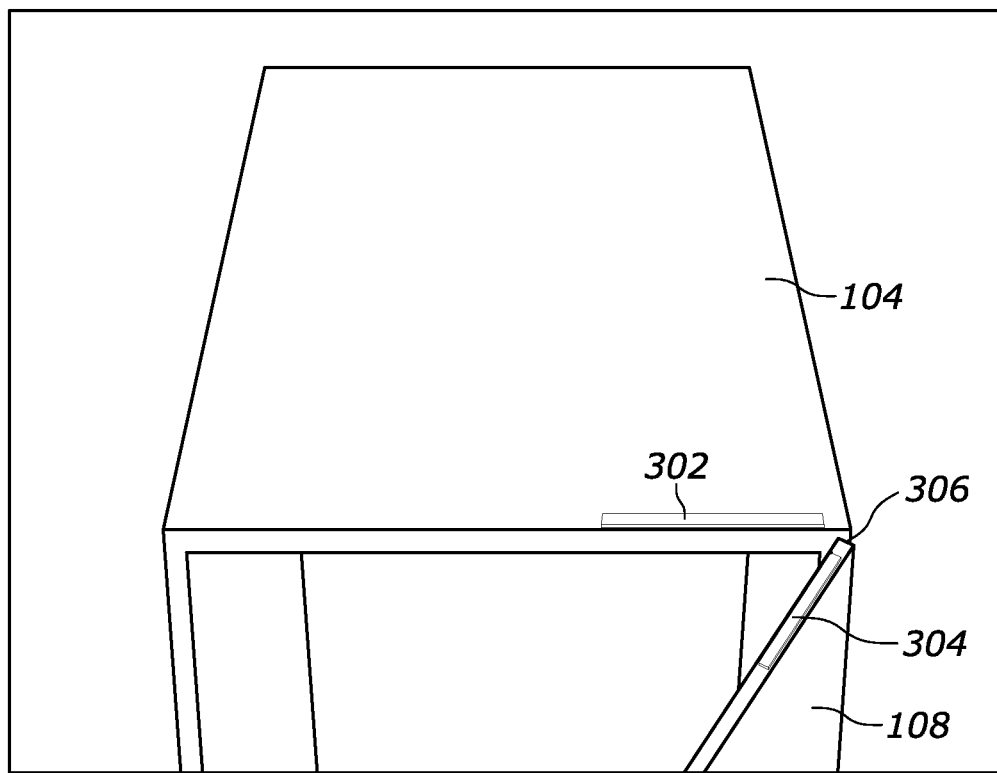
FIG. 3 illustrates an example equipment rack with installed tracking strips.

Referring now to FIG. 3, a view of the server rack 104 is shown, with two tracking strips 302, 304 installed. As before, the first tracking strip 302 is mounted on the frame of the rack 104, while the second tracking strip 304 is mounted on the rack door 108, and the two tracking strips 302, 304 are preferably mounted so that they are parallel to each other when the rack door 108 is closed and also are preferably mounted close to the hinge 306. Since the rack door 108 is in an open position, the two tracking strips 302, 304 are not parallel, but are positioned at a relative angle to each other, with the right end of tracking strip 302 being very close to the right end of tracking strip 304. In other words, the right end of tracking strip 304 can be viewed as "intersecting" the right end of tracking strip 302.

Figure 4:
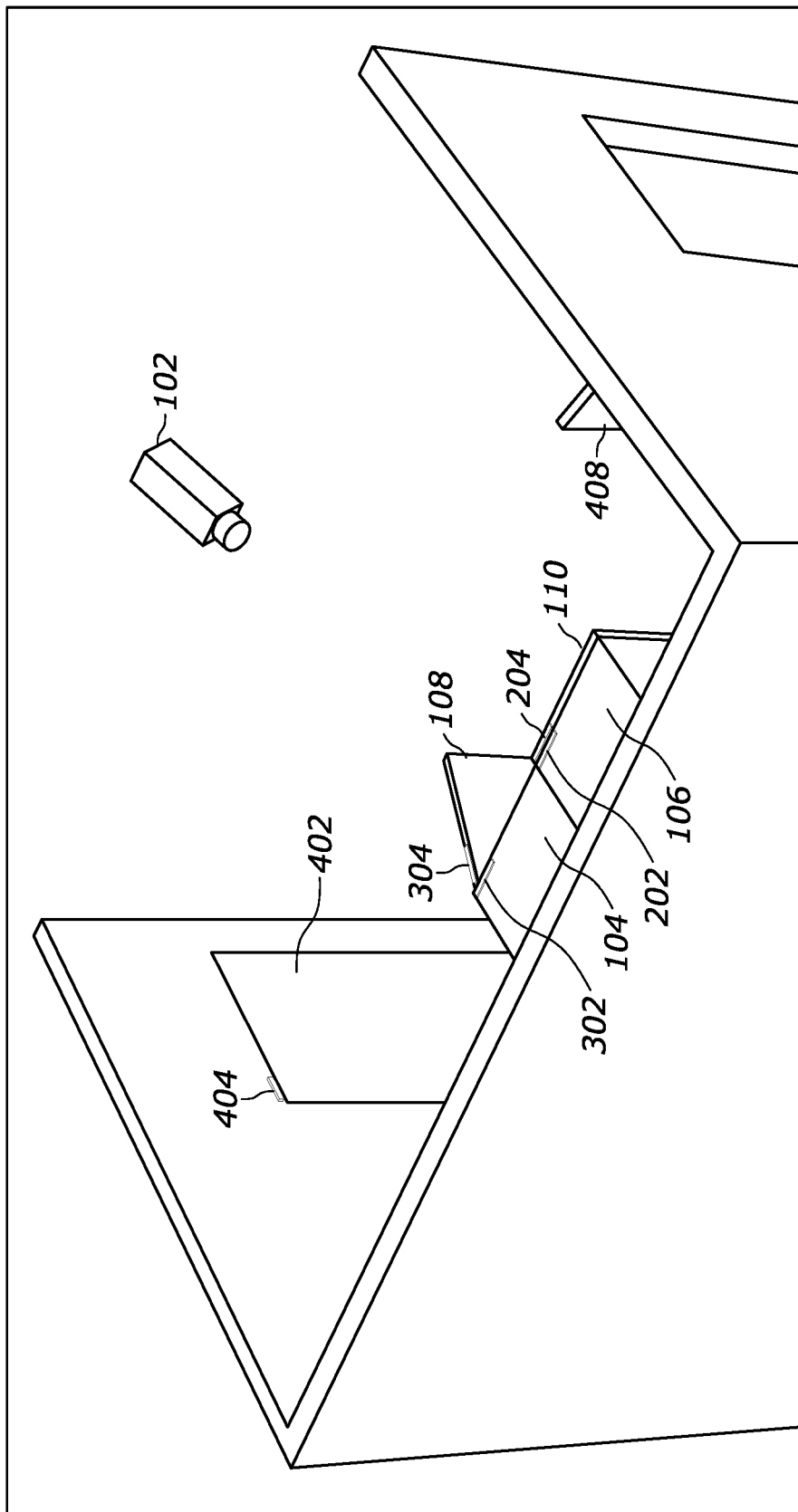
FIG. 4 illustrates an example data closet with door tracking strips installed.

There are two conditions that can indicate that a door is closed. One door-closed condition is where two parallel adjacent strips are observed (e.g., see FIG. 2). A second door-closed condition is where only one tracking strip is observed and both ends of the tracking strip are absent from any intersecting tracking strips. Such can occur if, due to the resolution of the captured image (i.e., the number of pixels representing the area including the tracking strips), two closely spaced tracking strips are interpreted as one tracking strip. This can occur when viewing tracking strips at a distance, or when using wide-angle lenses that increase distortion. Such can also occur when the tracking strip mounted to the door is mounted on the top of the door which is hidden from view by the door frame when the door is closed. An example of such a hidden tracking strip corresponding to a closed doorway is shown in FIG. 4 below. Any other state indicates a door is open (e.g., see FIG. 3).

Referring now to FIG. 4, the data closet 100 is shown with the racks, doors, and tracking strips described above. Also shown is a personnel door 402 with tracking strip 404 visible since it is attached to the door frame for door 402, whereas the corresponding tracking strip attached to the door 402 itself is not visible because the door 402 is closed and the second strip is hidden by the frame. A second personnel door 408 is also shown. The camera 102 is typically positioned facing the row of racks, as shown. However, due to the advantage of the tracking strips, the actual camera position is not critical. Where a 360° view is required, multiple cameras may be used. Door monitoring using tracking strips will also work well with cameras having very wide-angle lenses by applying a de-warp image processing stage.

Figure 5:
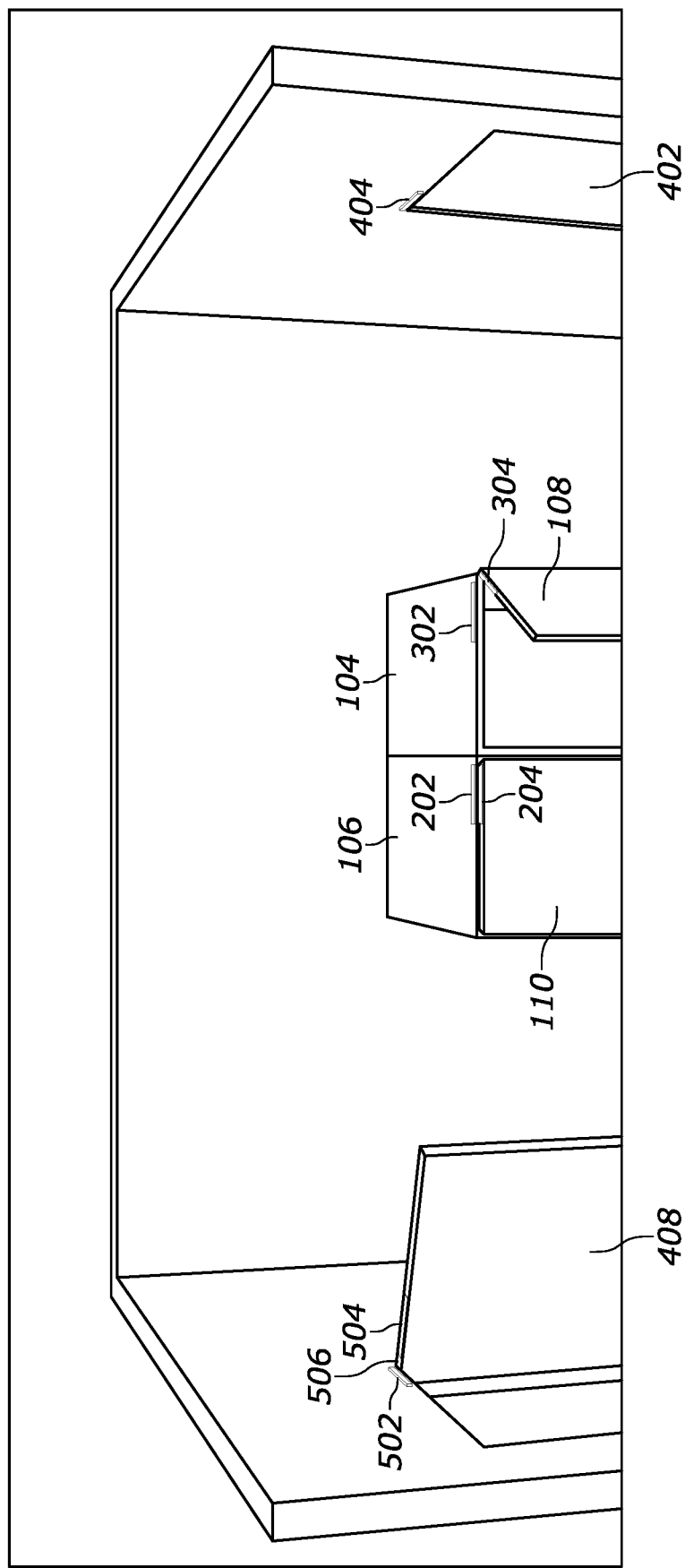
FIG. 5 illustrates a perspective frontal view from the camera of the example data closet shown in FIG. 4.

FIG. 5 depicts the view of the data closet 100 from the location of the camera 102. In this view, the two tracking strips 502, 504 associated with personnel door 408 can be seen. Stationary strip 502 is mounted to the door frame close to the door hinge 506, and the second tracking strip 504 is mounted on the top of the door 408. As a result, when the door 408 is closed, the top of the door 408 is beneath the top of the door frame, and the second tracking strip 504 is not visible in the view of camera 102. Only the stationary tracking strip 502 is visible when the door 408 is closed, just as only the stationary tracking strip 404 is visible with personnel door 402 closed.

Figure 6:
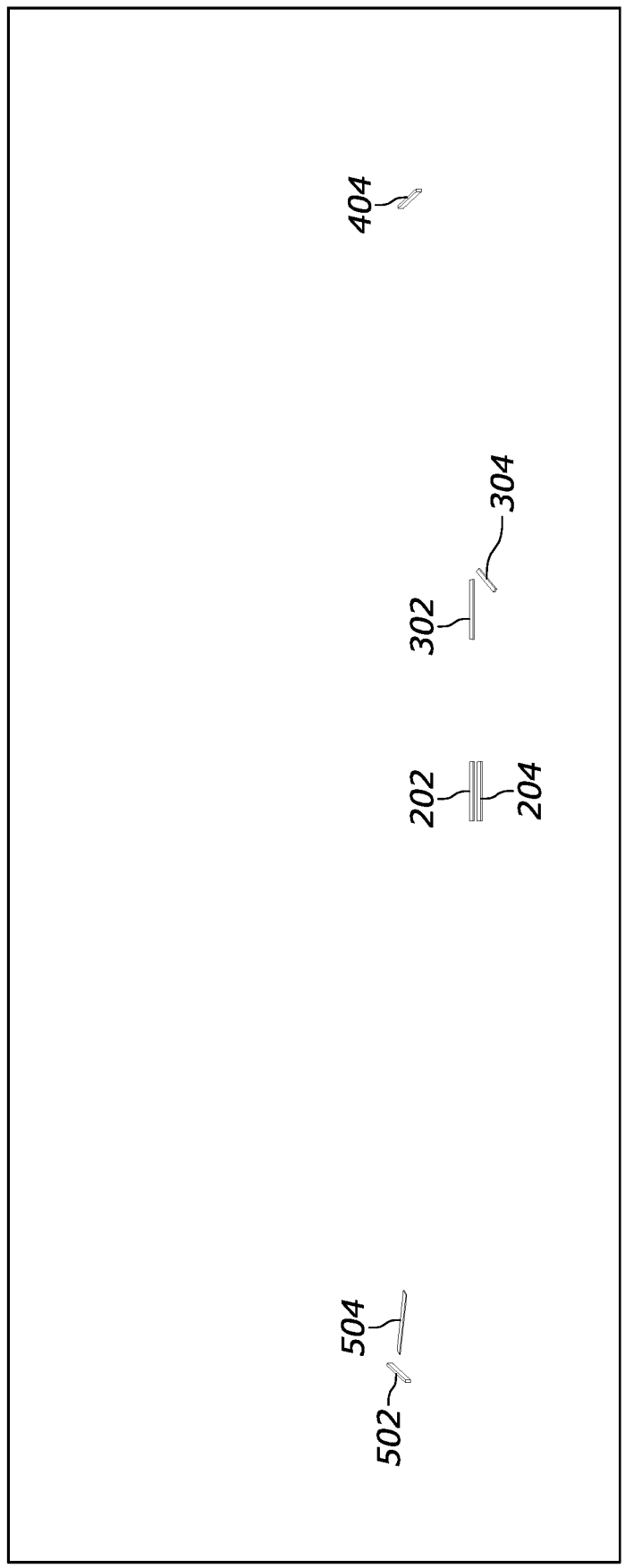
FIG. 6 illustrates a perspective frontal view from the camera of the example data closet shown in FIG. 4, after application of a color filter to the image, and annotated with detected door state.
Figure 7:
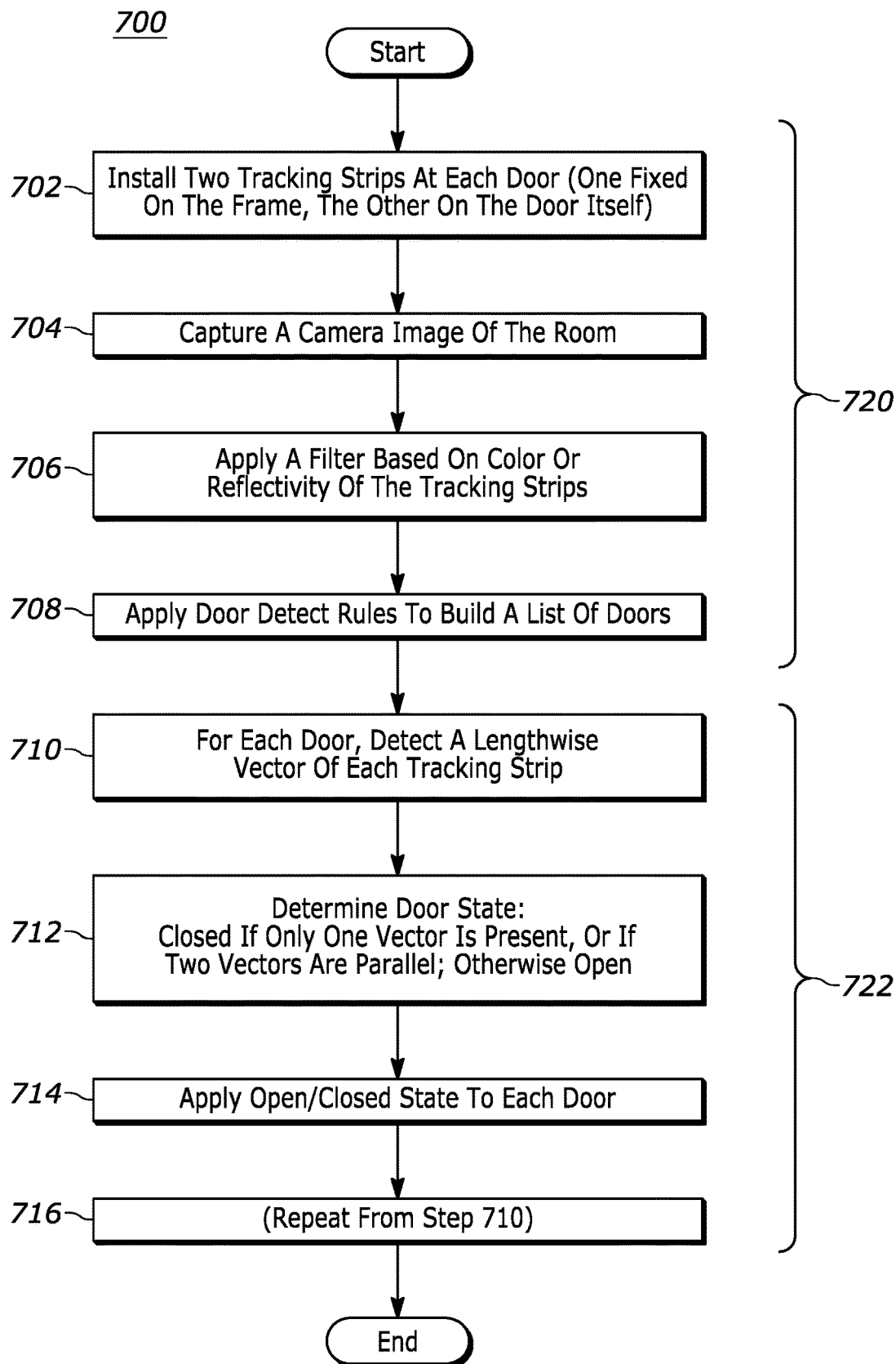
FIG. 7 illustrates a flowchart of an example method for determining door state by optically viewing tracking strips.

FIG. 7 illustrates an example process 700 of installing and detecting door state, and is described below with reference to FIG. 5 and FIG. 6. First, at step 702, two tracking strips are installed at each door, with one strip fixed on the door frame and the other mounted on the door itself. The strips are preferably mounted so that they are parallel to each other when the door is closed. Only the fixed-position strip need be visible when the door is closed. The tracking strips preferably should be mounted close to the hinge to better maintain the association of the two strips regardless of door position. All strips should be in-view of the camera 102. FIG. 5 shows the complete strip installation from the camera perspective.

At step 704, the camera captures an image, such as that shown in FIG. 5, of the room. At step 706, a filter is applied based on the color or reflectivity of the tracking strips, which maintains any portion of the image corresponding to the selected color or reflectivity, and discards the remaining portion of the image. The resulting image is shown in FIG. 6, which shows each tracking strip that survives the filter operation, and excludes all other features from the original camera image. At step 708 door detect rules are applied to build a list of doors. For example, a door is detected for each group of one or two lines. In embodiments, door reference numbers along with meta-data descriptions can be manually or automatically applied.

In embodiments, imaging analytics can use open-source computer vision libraries such as OpenCV. An image can be first converted from RGB color space to HSV, and a color filter can then be applied to isolate the tracking strips. In the case of reflective strips and an infrared light source, the brightness (luminous intensity) can be used to isolate the tracking strips within the image. Once the tracking strips are isolated, a line detection algorithm, such as the Hough transform, or Radon transform can be used to identify the location of lines corresponding to each tracking strip. Such lines can be viewed as a lengthwise vector that is parallel to the long axis of a tracking strip. In embodiments, a lengthwise vector can be aligned with either of the long edges of the tracking strip. In embodiments, a lengthwise vector can be a lengthwise center axis of the tracking strip.

At step 710, the center axis of each tracking strip is detected. At step 712, the door state is determined. For each door, the door is closed if: only one lengthwise vector (i.e., "line") is detected, or two lines are detected and are parallel (within a margin of error due to quantization); otherwise the door state is determined to be open. In this example, the single tracking strip 404 corresponds to a closed door. The pair of substantially parallel tracking strips 202, 204 corresponds to a closed door. The pair of "intersecting" tracking strips 302, 304 corresponds to an open door. Likewise, the pair of "intersecting" tracking strips 502, 504 also corresponds to an open door. At step 714, the open/closed states are applied to each door. At step 716 the process of door state detection repeats from step 710. In certain embodiments, the process may run continuously. In other embodiments, the process may run periodically.

In embodiments, the tracking strips can include a self-adhesive layer, and such self-adhesive tracking strips can be installed quickly and without special training or tools. The tracking strips can provide a reference point for video analytics processing by having a known length and color or reflectivity. With minimal processing, the camera can detect the strips by color, shape and length. Due to the perspective view, dimensional checks can be secondary. Immediately after installation, suitable video analytics software can detect the location and state of each door.

In embodiments, the preferred length of the tracking strip is approximately one-half the width of the narrowest door in the data closet. This length can allow the system to reliably detect double-door configurations. The tracking strips preferably are sufficiently wide to allow reliable detection by the video system, although such width may be constrained by the thickness of the door, the doorjamb, and/or the door trim.

In embodiments, the color of the tracking strips preferably contrasts with colors present the room, and particularly with the dominant background color. Equipment racks are most commonly matte black paint, providing flexibility for color selection. Green can be a good option in many situations, although other colors can also be suitable.

Since equipment rooms are often lights-out, in embodiments the tracking strip system may implement automatic lighting control either for visible lighting or infrared illumination. Infrared illumination may be used with reflective tracking strips.

Figure 8:
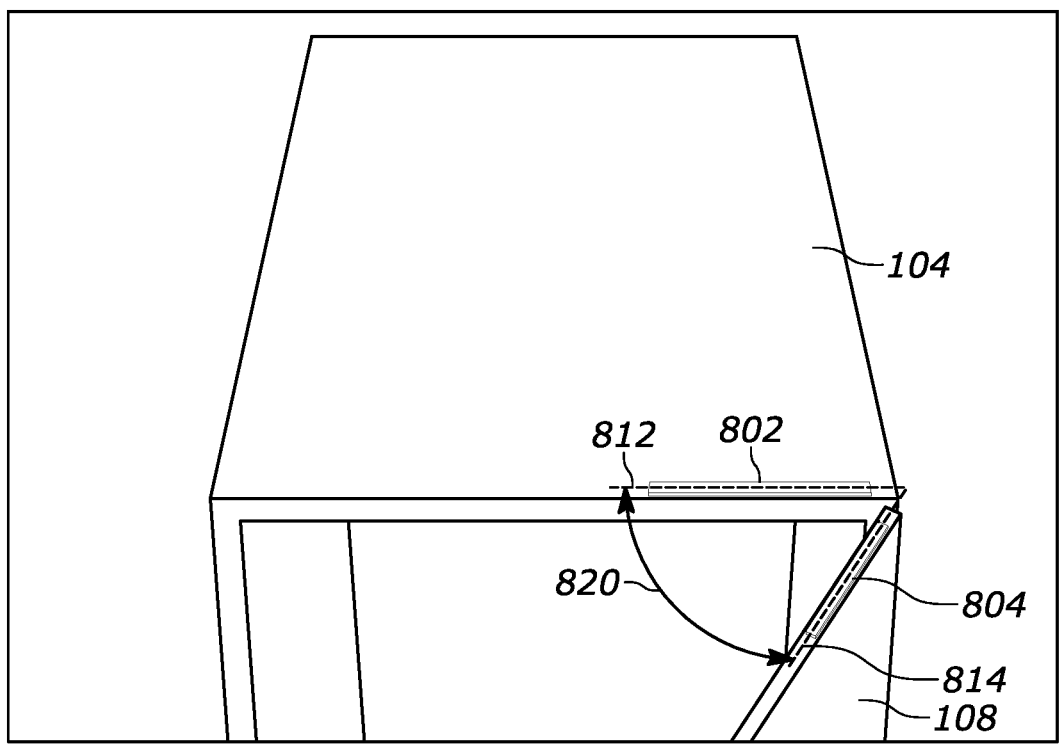
FIG. 8 illustrates an example equipment rack with its door open to depict door position estimation.

FIG. 8 shows an example of door angle estimation using 3-dimensional vectors. In this example, angle estimation can use the known-length parameter of each tracking strip to estimate the angle 820 from a perspective view as seen from the camera 102.

Figure 9:
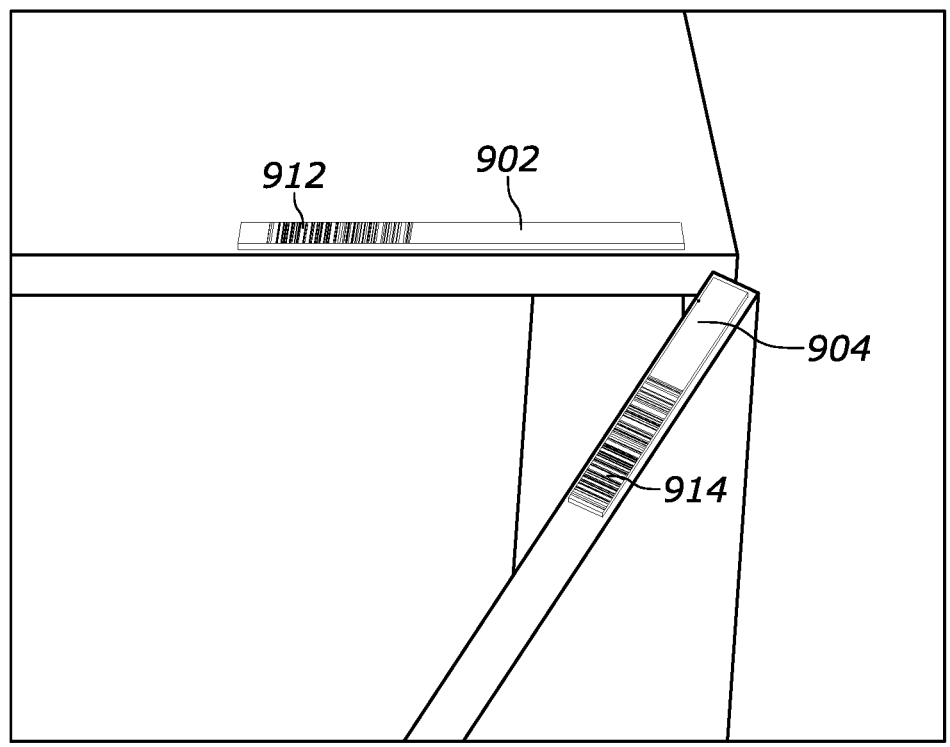
FIG. 9 illustrates example tracking strips with barcode identifiers.

FIG. 9 shows an example of a pair of tracking strips 902, 904 that includes respective barcodes 912, 914 for identification. The barcode can be read by the analytics software and can provide a unique tracking number for that door. The tracking strip can also have a human-readable code corresponding to the barcode. One advantage is that door identifiers can be defined during installation. An additional advantage is that two strips, having the same code, can be automatically associated with each other and with a particular door location.

As used herein, a door can mean any door or openable window, either hinged, sliding, or rolling. The techniques disclosed herein are described primarily in the context of hinged doors, but also have applicability to other door configurations.

Using a system such as those example systems described, video analytics can be utilized to reliably detect door position without requiring any training. In certain embodiments, an optional training step can be initiated after installation, where the installer manually opens and closes each door in view of the camera. The analytics system can detect each strip and determine the limits of motion for each detected door.

As can be appreciated, many aspects of inventive concepts are disclosed herein. In one aspect, a method is provided for monitoring door state using image analytics. Such a method can include capturing, using an imaging sensor, an image that includes a view of a first doorway having a first pair of tracking strips associated with said first doorway, one tracking strip of said first pair being attached to the door, and the other tracking strip of the first pair being fixed to the frame of the doorway, each of said first pair of tracking strips being of a length greater than a width. Such a method can further include detecting in the image, using a processor, at least one of the first pair of tracking strips associated with the doorway, and determining, using the processor, a lengthwise vector of each detected tracking strip. Such a method can further include setting the door state to closed if only one of the pair of tracking strips is detected, or if both tracking strips of the pair are detected and their respective lengthwise vectors are substantially parallel, and setting the door state to open if both tracking strips of the pair are detected and their respective lengthwise vectors are substantially non-parallel.

In some examples, the tracking strips can have a color that contrasts with a dominant background color surrounding the tracking strips. In some examples, the tracking strips can have a reflective surface. In some examples, the color of the tracking strips can be green. In some examples, each of the tracking strips can include an identifying bar code. In some examples, the respective bar codes for the pair of tracking strips can be identical. In some examples, such an identical identifying bar code can identify the doorway.

In some examples, a method can include illuminating the doorway using an infra-red light source and an infra-red camera, and the tracking strips can have a reflective surface. In some examples, the length of each tracking strip can be approximately one-half that of a door having the narrowest width. In some examples, the lengthwise vector can comprise a lengthwise center axis. In some examples, a method can further include estimating a door angle using the length of each tracking strip.

In some examples, a method can include converting the image to a hue-saturation-value (HSV) color space, applying a filter corresponding to color or reflectivity of the strips to isolate the tracking strips within the HSV image, and applying a live detection algorithm to identify the lengthwise vector of each detected strip. In some examples, a method can include performing a training phase by manipulating each door through its range of movement, and detecting for each door a corresponding limit of motion.

In another aspect, a system is provided for monitoring door state of at least one doorway. Such a system can include a first pair of tracking strips associated with a first doorway, one tracking strip of said first pair being attached to the door, and the other tracking strip of the first pair being fixed to a frame of the first doorway, each of said first pair of tracking strips being of a length greater than a width. Such a system can include a camera configured to capture an image that includes a view of the first pair of tracking strips associated with the first doorway. Such a system can include a processor adapted and configured to: (1) detect in the image at least one of the first pair of tracking strips associated with the first doorway; (2) determine a lengthwise vector of each detected tracking strip; (3) set the door state to closed if only one of the pair of tracking strips is detected, or if both tracking strips of the pair are detected and their respective lengthwise vectors are substantially parallel; and (4) set the door state to open if both tracking strips of the pair are detected and their respective lengthwise vectors are substantially non-parallel.

In some examples, the tracking strips can have a color that contrasts with a dominant background color surrounding the tracking strips. In some examples, the tracking strips can have a reflective surface. In some examples, the color of the tracking strips can be green. In some examples, each of the tracking strips can include an identifying bar code. In some examples, the respective bar codes for the pair of tracking strips can be identical. In some examples, such an identical identifying bar code can identify the doorway.

In some examples, the processor can be further adapted and configured to illuminate the doorway using an infra-red light source and use an infra-red camera, and the tracking strips can have a reflective surface. In some examples, the length of each tracking strip can be approximately one-half that of a door having the narrowest width. In some examples, the lengthwise vector can comprise a lengthwise center axis. In some examples, the processor can be further adapted and configured to estimate a door angle using the length of each tracking strip.

In some examples, the processor can be further adapted and configured to convert the image to a hue-saturation-value (HSV) color space, apply a filter corresponding to color or reflectivity of the strips to isolate the tracking strips within the HSV image, and apply a live detection algorithm to identify the lengthwise vector of each detected strip. In some examples, the processor can be further adapted and configured to perform a training phase by manipulating each door through its range of movement, and detect for each door a corresponding limit of motion.

Temperature and Leak Detection

Figure 10:
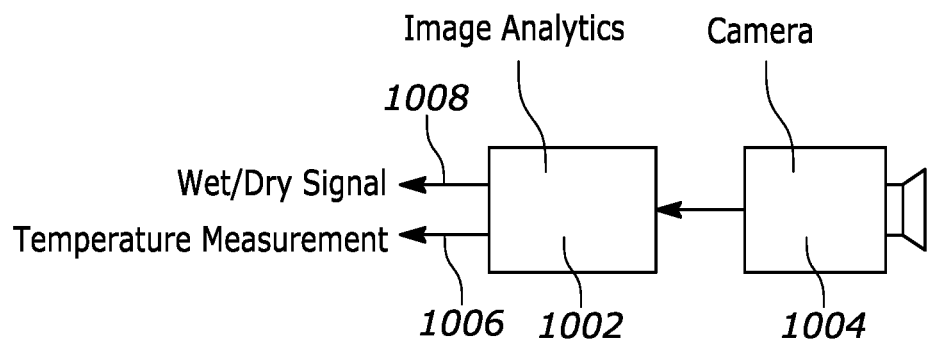
FIG. 10 illustrates a block diagram of an example temperature and water sensing system.

Monitoring systems and methods disclosed herein can also provide for reliably monitoring a room containing chromic (e.g., water and temperature) sensor patches using video analytics. In embodiments, one or more chromic sensor patches can be monitored with a single system. The described example systems can reduce or eliminate training data for new environments. In certain embodiments, an example monitoring system includes a video analytics system employing a camera, video processing hardware, and video analytics software to monitor a room containing chromic sensor patches. A camera already present in the room for security purposes can also be used for the monitoring system. In addition, such a monitoring system can also be used to monitor door state as described above FIG. 10 shows a block diagram of an example system 1000, which includes a camera 1004, an electronic processor 1002 performing image analytics to data mapping, output 1006 to indicate the value of a temperature measurement, and output 1008 to indicate a wet/dry condition of a moisture sensor. The camera 1004 is configured to capture an image. Analytics software executing on the processor 1002 takes the image data and identifies sensor regions within the image view. Color and pattern recognition can be applied to determine the sensor state. The results can be sent over a communication link such as outputs 1006 or 1008, or accessed through a software application programming interface (API), such as over an ethernet connection (not shown).

Figure 11:
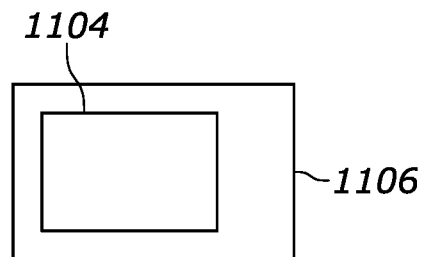
FIG. 11 illustrates an example thermochromic patch.

Referring now to FIG. 11, an example chromic sensor 1102 is shown which includes a region 1104 of chromic ink applied to a substrate, such as a self-adhesive label 1106. In this example, such a chromic ink can have thermochromic properties in which the color of the ink changes as a function of its temperature. The label 1106 can be affixed to the surface of an equipment item to be monitored for temperature (not shown). The system camera 1004 can be positioned so that one or more sensor patches (e.g., sensor 1102) are in view. The camera 1004 captures an image and detects individual patches by filtering for the range of colors characterized for the thermochromic ink. The color of each patch can then be extracted and correlated to a temperature measurement, such as by using a look-up table.

Figure 12:
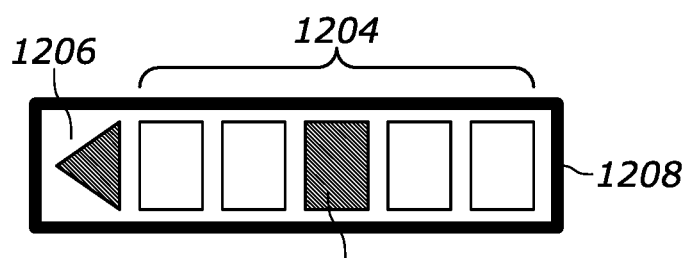
FIG. 12 illustrates another example thermochromic patch.

Referring now to FIG. 12, an example chromic sensor 1202 is shown which includes a plurality of regions 1204, each including a respective temperature-sensitive liquid crystal material that is responsive to a respective range of temperatures. When the temperature matches the range for a specific liquid crystal region 1204, the region color will change, for example from black to green, or from black to red. The system can capture the image and determine which region or regions (also referred to as windows) have a color change. The window location can then be correlated to a temperature measurement, such as by using a look-up table or other suitable technique.

The example sensor strip 1202 additionally can include a registration mark or symbol 1206 to allow the image processor to determine the orientation of the sensor, and can also include an optional border 1208, both preferably in a contrasting color to the dominant environment color of surrounding objects in the area to be monitored. Including such an orientation symbol 1206 and/or border 1208 can significantly improve reliability and accuracy of the image analytics. Preferably, such a contrasting border or symbol is common to all sensor patches that serves as an identifier for the image processor. The border or symbol allows the image processor to distinguish the sensors from surrounding objects. Colors such as green or blue can be more easily distinguished from matte black paint and black anodizing used on most equipment surfaces.

A similar system and method can be used to check for water in order to detect leaks. For water detection, a material having hydrochromic properties, such as a hydrochromic ink, can be applied to a substrate or label, and the label placed on a surface to be monitored, such as a horizontal surface such as the floor or the top of a rack, and in view of the camera. The default (dry) state of the label is a color that preferably contrasts from the environment. In embodiments, the camera can capture an image and detect individual patches by filtering for the default color. The location of each sensor patch can be recorded and optionally associated with a named location. When water touches a sensor patch, the system can detect the color change and generate an appropriate alert. Another example of a hydrochromic material includes a multi-layer structure having an outer material layer that dissolves when exposed to water, to expose an inner layer (or base layer) having a different color than the outer layer material. Consequently, as used herein, a hydrochromic material includes intrinsic materials as well as composite or assembled materials.

Figure 13A:
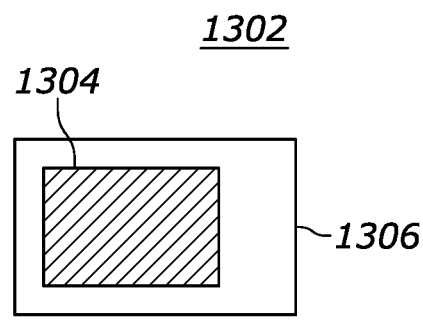
FIG. 13A illustrates an example hydrochromic patch.

Referring now to FIG. 13A, an example chromic sensor 1302 is shown which includes a region 1304 of hydrochromic ink applied to a substrate, such as a self-adhesive label 1306. The color of the hydrochromic ink changes as a function of detected moisture. The label 1306 can be affixed to the surface of an equipment item to be monitored for moisture (not shown). The system camera 1004 can be positioned so that one or more sensor patches (e.g., sensor patch 1302) are in view. The camera 1004 can capture an image and detect individual patches by filtering for the range of colors characterized for the hydrochromic ink. The color of each patch can then be extracted and correlated to detected moisture, such as by using a look-up table or other suitable technique.

Figure 13B:
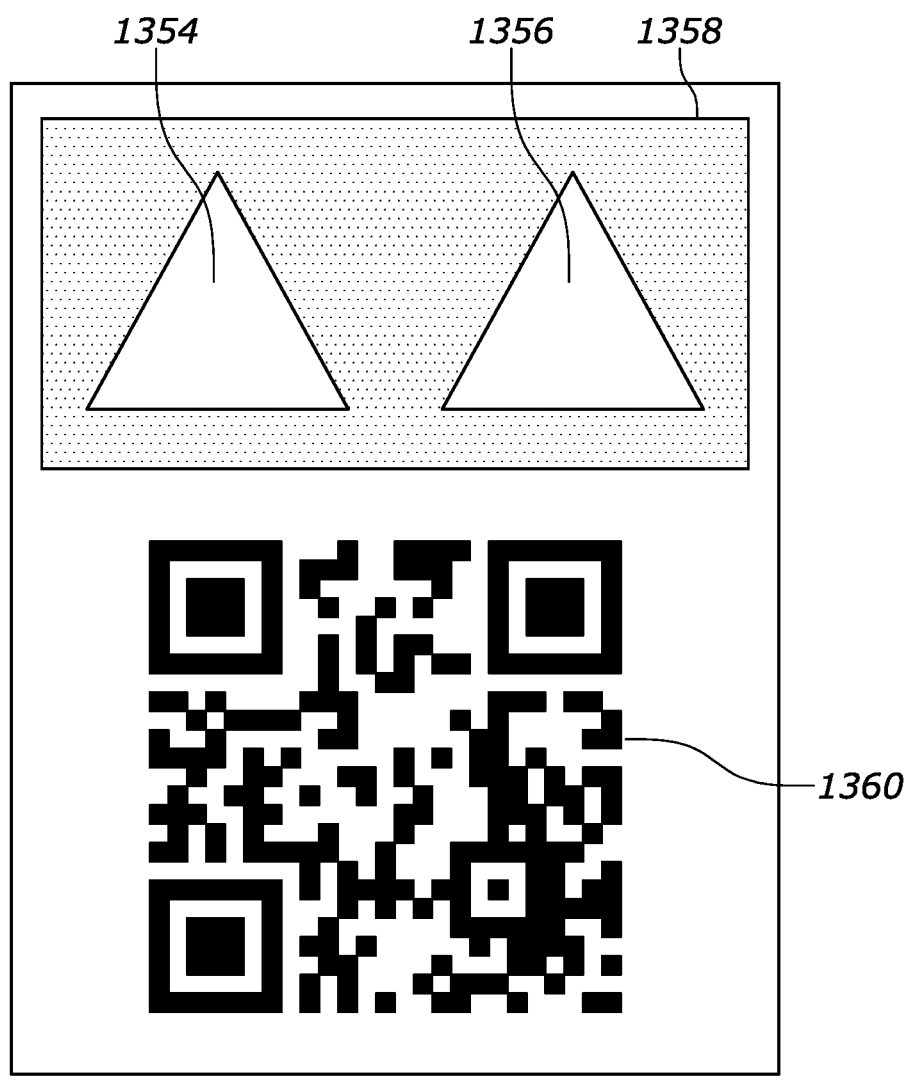
FIG. 13B illustrates another example hydrochromic patch including an identification symbol and a barcode.

Referring now to FIG. 13B, an example chromic sensor 1352 is shown which includes a rectangular region 1358 within which are two triangular regions 1354, 1356. In embodiments, region 1358 can be a hydrochromic material (e.g., a hydrochromic ink) applied to a substrate, and regions 1354, 1356 can be bare regions without such hydrochromic material. The distinct triangular shape of regions 1354, 1356, and the distinct contrast in color compared to region 1358, help identify the location of the chromic sensor patch. In embodiments, regions 1354, 1356 can include a hydrochromic material, and region 1358 can be a bare region without such hydrochromic material, but having a contrasting color compared to both the dry and wet color of the regions 1354, 1356, and preferably also compared to the dominant color of the equipment within the monitored area.

In some embodiments, a barcode can be included on such sensor patches described above. The barcode can be printed with a standard process and sized to allow scanning by the camera. The barcode symbol can encode an identifier, such as a serial number, to enable the camera and image processor system to uniquely identify each sensor patch.

In embodiments, each temperature measurement may be associated with an asset by logging the measurement and using the barcode to access an equipment database, so that the temperature of each item is known. Using this data, equipment temperature can be compared to the limits for each equipment item where an alert is generated if a limit is exceeded.

Figure 14:
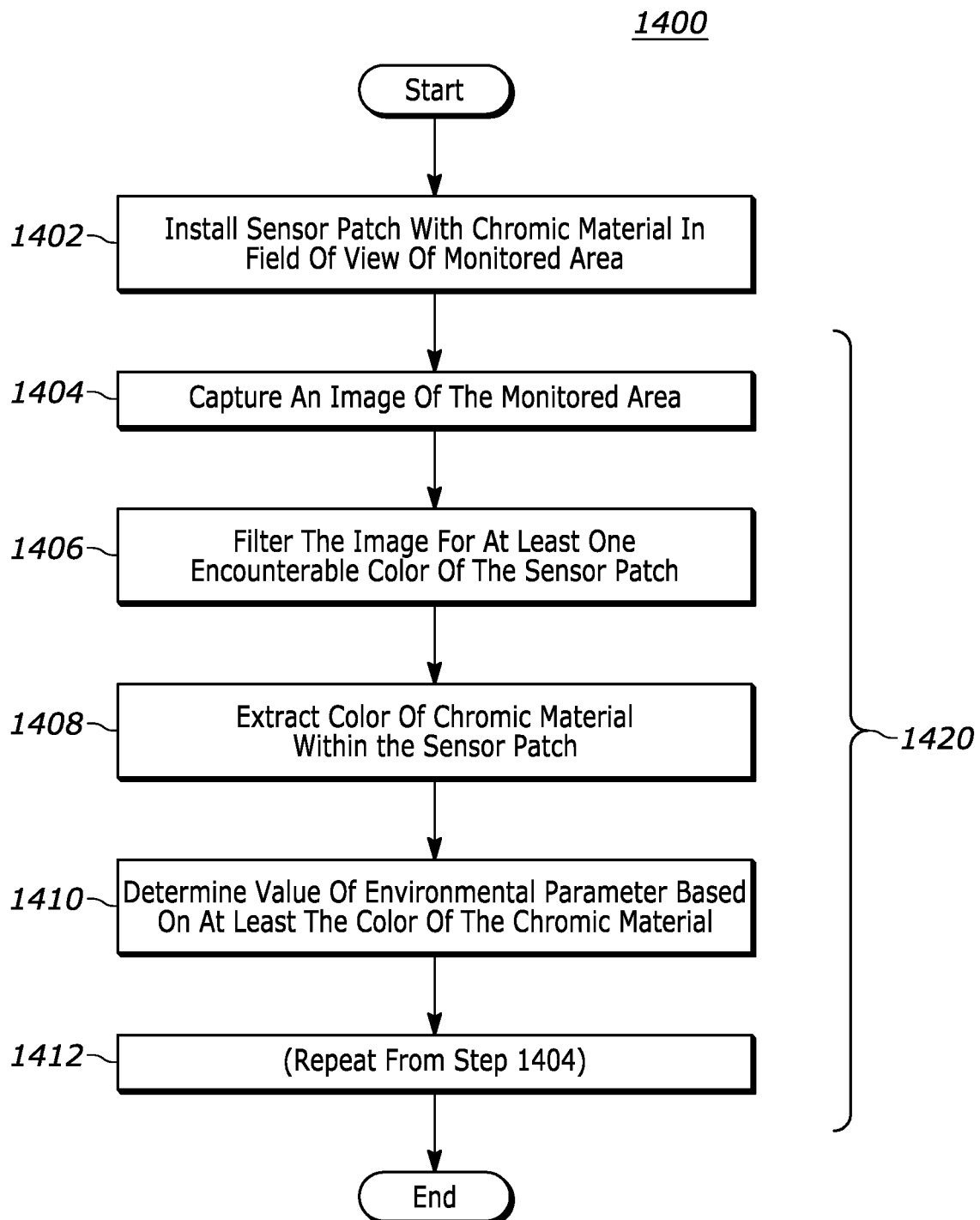
FIG. 14 illustrates a flowchart of an example method for determining the value of an environmental parameter by optically viewing a chromic sensor strip.

FIG. 14 illustrates an example process 1400 of installing chromic sensor patch and determining the value of an environmental parameter, and is described below with reference to FIGS. 10-13B and FIG. 17. First, at step 1402, a sensor patch with chromic material is installed in the monitored area within the camera's field of view. At step 1404, the camera captures an image of the monitored area. At step

1406, the image is filtered for at least one encounterable color of the sensor patch. Such an encounterable color is any color that can be potentially found within the sensor patch, such as any possible color of the chromic material (i.e., as its color may vary as a function of the temperature or moisture level), a color of the border, a color of an identifying symbol on the sensor patch, etc. In embodiments, imaging analytics can use open-source computer vision libraries such as OpenCV. An image can be first converted from RGB color space to HSV, and a color filter can then be applied to isolate the encounterable color of the sensor patch. In embodiments, the at least one encounterable color can correspond to a border, label, marker, symbol, registration feature, or other indicia that serves to orient the sensor patch and/or locate the actual chromic material(s) within the sensor patch. In embodiments, the at least one encounterable color can correspond to a possible color of the chromic material itself. In embodiments, the at least one encounterable color can correspond to one of a plurality of encounterable colors of the sensor patch.

At step 1408 the color of the chromic material within the sensor patch is extracted. At step 1410, the value of the environmental parameter is determined based at least on the color of the chromic material of the sensor patch. At step 1412 the example process repeats from step 1404. In certain embodiments, the process 1420 may run continuously. In other embodiments, the process 1420 may run periodically.

Figure 15:
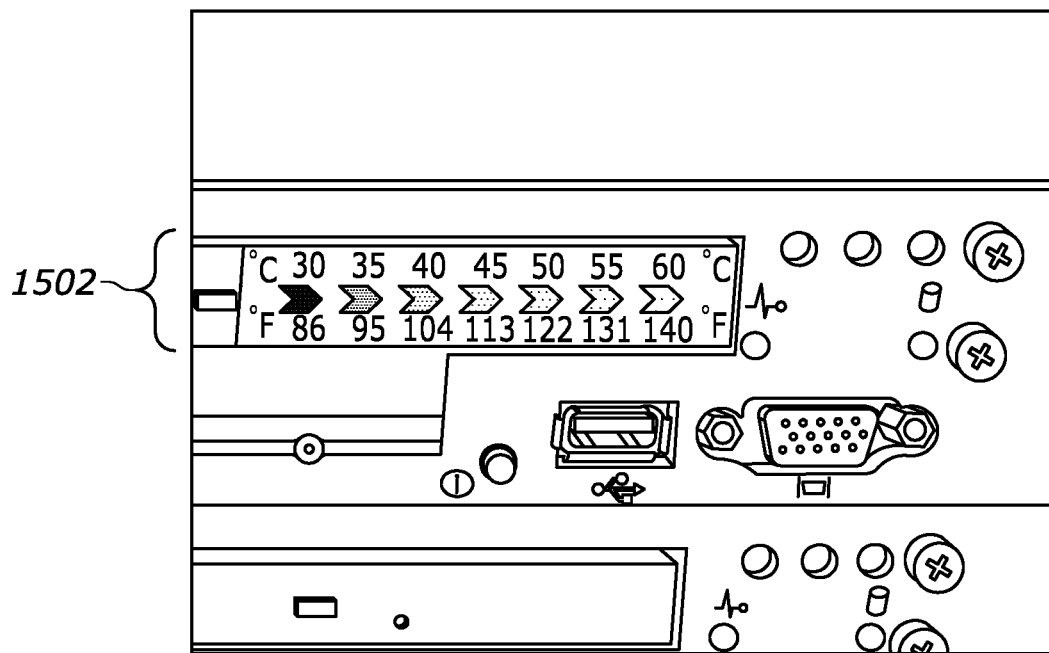
FIG. 15, labeled prior art, illustrates a traditional thermochromic patch on equipment.

FIG. 15 is a photo of a commercially available temperature sensor patch installed on a server equipment. In this example, the size, location, color, and absence of identifiers contributes to difficulty reading the temperature using an automatic image analytics system.

Figure 16:
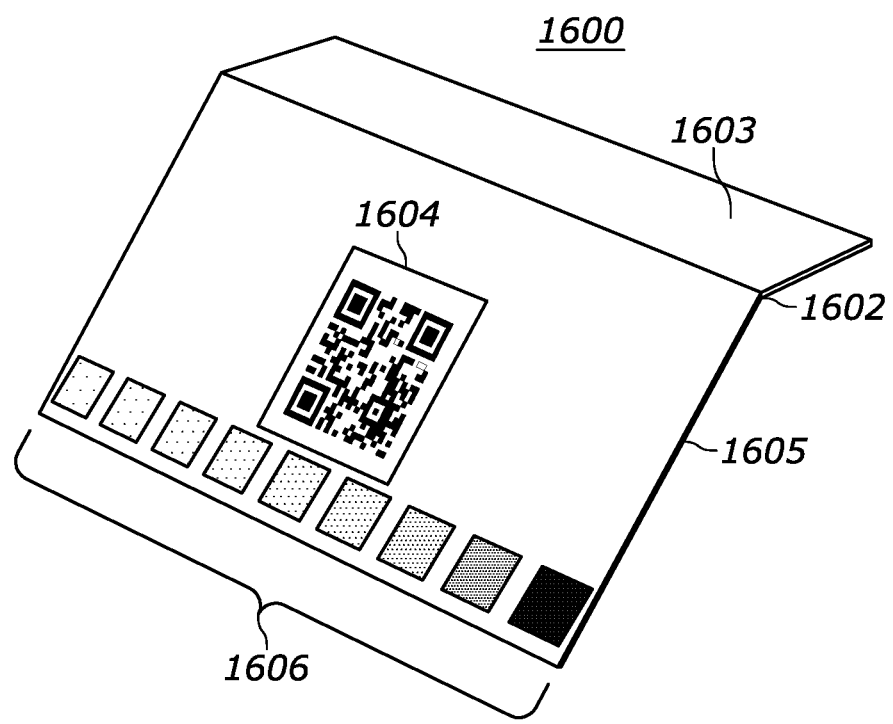
FIG. 16 illustrates an example thermochromic patch with barcode and angled attachment tab.
Figure 17:
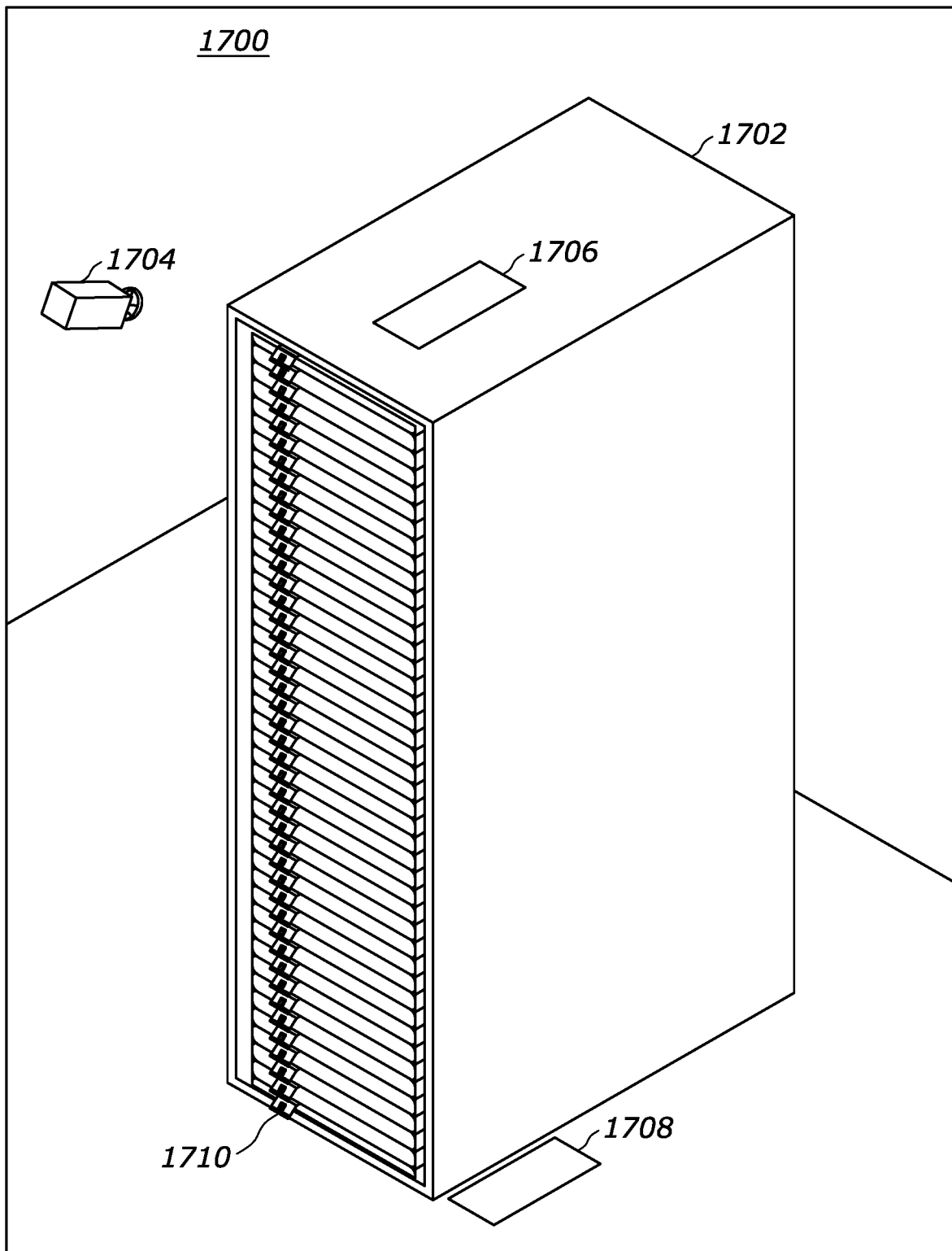
FIG. 17 illustrates an example equipment rack and a camera positioned in front of and above the rack, with thermochromic sensor patches attached to each rack equipment item, a hydrochromic sensor patch on the floor, and a hydrochromic sensor patch on top of rack.

FIG. 16 illustrates an example angled sensor patch incorporating a QR barcode. Referring to the non-limiting example of FIG. 16, an example sensor patch 1600 includes an array of thermochromic materials 1606, and a barcode symbol 1604. The sensor patch 1600 also includes an angle (i.e., a bend 1602) of, for example, approximately 135° as shown. Such a bend angle can result in approximately a 45° angle relative to the front panel of the equipment item to which it is attached, which is likewise approximately a 45° angle relative to the horizontal. The sensor patch 1600 can be fashioned using PVC or similar low-cost plastic sheet material. One surface contains the tracking barcode symbol 1604 which can be oriented toward an elevated camera, for example as shown in FIG. 17 as described hereinbelow. The angle of the sensor patch 1600 can be helpful for viewing the sensor patches attached to equipment items in a rack from a position at or above the height of the rack. An additional benefit of this configuration is that the sensor patch can be in the airflow path through the equipment item, but such airflow is not substantially impeded by the sensor patch.

In some embodiments, the sensor patch 1600 can include a base layer having a bend 1602 that defines non-coplanar respective first section 1605 and second section 1603 on opposite sides of the bend 1602, a barcode symbol 1604 disposed within the first section 1605, and an attachment surface disposed within the second section 1603. The attachment surface can be adapted to attach the sensor patch to an equipment item. In some embodiments, the attachment surface can include an adhesive coating to provide a self-adhesive attachment surface. In some embodiments, the barcode symbol 1604 can be formed by a patterned surface layer disposed on a front surface of the base layer. For example, such patterned surface layer can be printed on the base layer of the sensor patch. As another example, such patterned surface layer can be an embossed pattern on the front surface of the base layer.

In some embodiments, the bend 1602 can form an obtuse angle so that, when the sensor patch 1600 is attached to an equipment item, the second section 1603 contacts a first surface of the equipment item (e.g., the top surface of the equipment item), and the first section 1605 forms an acute angle with respect to a second surface of the equipment item (e.g., the front panel of the equipment item) perpendicular to the first surface of the equipment item. In some embodiments, the attachment surface can be disposed on a back surface of the second section 1603 and the barcode symbol 1604 can be disposed on a front surface of the first section 1605.

An angled sensor patch can significantly reduce the impact on airflow compared to a similar sensor patch applied directly to the face of the equipment item. Due to the critical cooling requirements of many servers, including those defined by the server manufacturer, even small obstructions can have a measurable impact on cooling performance. This is particularly critical in 1-U equipment with multiple modules and in blade devices which have inherently small ports for airflow.

FIG. 17 illustrates an example equipment rack and camera positioned in front of and above the rack. Each equipment item in the rack has an attached angled thermochromic sensor patch. The angled patches can be helpful for viewing a rack from a camera position at or above the height of the rack. Referring to the non-limiting example of FIG. 17, a system 1700 includes a camera 1704 positioned in front of rack 1702 with respective thermochromic sensor patches 1710 on each 1U server, equipment item, or other asset disposed within the rack 1702, a first hydrochromic sensor patch 1708 placed on the floor next to the rack 1702, and a second hydrochromic sensor patch 1706 placed on the top surface of the rack 1702. All such sensor patches 1720, 1706, and 1708 can be monitored by the single camera 1704.

In such embodiments of a sensor patch including a bend, airflow through the equipment item is not significantly obstructed, the sensor patch can be attached to surfaces other than the primary face of the equipment item, and yet the chromic material(s) and barcode symbol of the sensor patch can be oriented toward the camera 1704. The optimal angle can be where the barcode at the bottom of the rack (lowest U-level) is substantially orthogonal to the axis of the camera. This is because the lowest U-level is furthest from the camera so the resolution of the camera versus the size of each barcode element becomes limiting. At the top of the rack, the barcode can be at oriented at 45° to the camera, reducing the viewable size to ~0.7 of the actual size, but since the camera is closer to the top of the rack than the bottom, software can more easily de-skew the barcode images near the top of the rack. The angled attachable sensor patch, combined with a fixed camera, improves upon prior systems and methods, by allowing a complete rack of sensor patches, including their respective barcodes, to be scanned effectively from a single fixed location.

The example sensor patch 1600 illustrated in FIG. 16 can be described as including a base layer having a bend that defines non-coplanar respective first and second sections on opposite sides of the bend. The bend can, but need not, bisect the sensor patch, and thus the first and second sections can, but need not, be identical in size.

Assets that can be monitored include, for example, servers, routers, switches, rack-based environmental equipment, storage devices, power distribution or conditioning devices, or other rack-based or free-standing equipment. Rack-based assets (also described herein as rack-mountable assets) are assets configured to be disposed or mounted in a rack. It is advantageous to be able to determine one or more environmental parameters corresponding to each equipment assets in each rack, including where each equipment item is located within the rack. This is often referred to as the U-level position. A system that accurately reports U-level temperature reporting allows rack capacity planning, analytical profiling of thermal behavior, and other operational metrics.

As can be appreciated, many aspects of such inventive concepts are disclosed herein. In one aspect, a method is provided for monitoring an environmental parameter using image analytics. Such a method can include capturing, using an image sensor, an image of a monitored area that includes at least a first sensor patch, said first sensor patch including a first region comprising a first chromic material responsive to the environmental parameter, and filtering the image for at least one encounterable color of the first sensor patch, using an electronic processor, to detect the first sensor patch at a location in the image. Such a method can include extracting from the image at the location, using the electronic processor, a color of the first chromic material in the first region, and determining a value of the environmental parameter based at least on the color of the first chromic material.

In some examples, the first chromic material can have a default color that contrasts with a dominant environment color of the monitored area. In some examples, determining a value of the environmental parameter can include correlating the color of the first chromic material with a corresponding value of the environmental parameter. In some examples, filtering the image can include filtering the image for a plurality of encounterable colors of the first sensor patch. The plurality of encounterable colors can include a range of possible colors of the first chromic material.

In some examples, the first sensor patch can include a plurality of regions, one of which is the first region, and each such region can include a respective chromic material responsive to a respective range of the environmental parameter. The image can be filtered for a range of possible colors of the plurality of chromic materials, to determine a location of a respective region within the first sensor patch exhibiting a specific color change relative to other regions of the first sensor patch, and the value of the environmental parameter can be determined based on the location of the respective region exhibiting the specific color change.

In some examples, the first sensor patch can include a registration feature to indicate an orientation of the first sensor patch. In some examples, the first sensor patch can include a border having a border color that contrasts with a dominant environment color of the monitored area. In some examples, the first sensor patch can include a bend between a first portion and a second portion thereof, with the first portion attachable to an equipment surface, and the second portion oriented at a non-zero angle to the equipment surface. The first region can be disposed within the second portion.

In some examples, the at least one encounterable color of the first sensor patch can include a default color of the first chromic material. In some examples, the first sensor patch can include a border having a border color that contrasts with a dominant environment color of the monitored area, and the at least one encounterable color of the first sensor patch can include the border color. In some examples, the border color can contrast with all possible colors of the first chromic material.

In some examples, the first sensor patch can include a barcode symbol to uniquely identify the first sensor patch, and the method can include scanning the barcode symbol and associating a corresponding barcode identifier with the first sensor patch. In some examples, a method can include saving the location within the captured image of the first sensor patch, capturing, using the image sensor, a subsequent image of the monitored area, extracting from the image at the location of the first sensor patch within the captured image, using the electronic processor, a subsequent color of the first chromic material in the first region, and determining a subsequent value of the environmental parameter based at least on the subsequent color of the first chromic material.

In another aspect, a system is provided for monitoring an environmental parameter using image analytics. Such a system can include a first sensor patch, an image sensor configured to capture an image of a monitored area that includes at least the first sensor patch, and an electronic processor. The first sensor patch can include a first region having a first chromic material responsive to the environmental parameter. The electronic processor can be configured and adapted to filter the image for at least one encounterable color of the first sensor patch to detect the first sensor patch at a location in the image, extract from the image at the location a color of the first chromic material in the first region, and determine a value of the environmental parameter based at least on the color of the first chromic material.

In some examples, the first chromic material can have a default color that contrasts with a dominant environment color of the monitored area. In some examples, the electronic processor can be configured and adapted to correlate the color of the first chromic material with a corresponding value of the environmental parameter. In some examples, the electronic processor can be configured and adapted to filter the image for a plurality of encounterable colors of the first sensor patch, where the plurality includes a range of possible colors of the first chromic material. In some examples, the first sensor patch can include a plurality of regions, one of which is the first region, and each such region can include a respective chromic material responsive to a respective range of the environmental parameter. The electronic processor can be further configured and adapted to filter the image for a range of possible colors of the plurality of chromic materials, to determine a location of a respective region within the first sensor patch exhibiting a specific color change relative to other regions of the first sensor patch, and to set the value of the environmental parameter based on the location of the respective region exhibiting the specific color change.

In some examples, the first sensor patch can include a registration feature to indicate an orientation of the first sensor patch. In some examples, the first sensor patch can include a border having a border color that contrasts with a dominant environment color of the monitored area. In some examples, the first sensor patch can include a bend between a first portion and a second portion thereof, with the first portion attachable to an equipment surface, and the second portion oriented at a non-zero angle to the equipment surface, and the first region is disposed within the second portion. In some examples, the at least one encounterable color of the first sensor patch can be a default color of the first chromic material. In some examples, the first sensor patch can include a border having a border color that contrasts with a dominant environment color of the monitored area, and the at least one encounterable color of the first sensor patch can be the border color. In some examples, the border color can contrast with all possible colors of the first chromic material.

In some examples, the first sensor patch can include a bend between a first portion and a second portion thereof. The first portion can be attachable to an equipment surface, and the second portion can be oriented at a non-zero angle to the equipment surface. The first region can be disposed within the second portion. In some examples, the first sensor patch can include a barcode symbol to uniquely identify the first sensor patch, and the electronic processor can be further configured and adapted to scan the barcode symbol and associate a corresponding barcode identifier with the first sensor patch.

In some examples, the electronic processor can be further configured and adapted to save the location within the captured image of the first sensor patch, capture a subsequent image of the monitored area, extract from the image at the location of the first sensor patch within the captured image a subsequent color of the first chromic material in the first region, and determine a subsequent value of the environmental parameter based at least on the subsequent color of the first chromic material.

Monitoring Device

The techniques and methods described above can be performed by powerful computing devices, such as servers, which can be distant from the camera in the monitored room. However, advancements in semiconductor technology now allow powerful multi-core MPUs and GPUs to operate at much lower power. A monitoring device that combines a low-power processor with an integrated camera, battery, sensors, software, and communication links, can be capable of processing video, performing video analytic functions, and artificial intelligence operations, and can detect, record, and communicate events and anomalies that might impact the ability of an edge computer system to function or to remain secure.

Figure 18A:
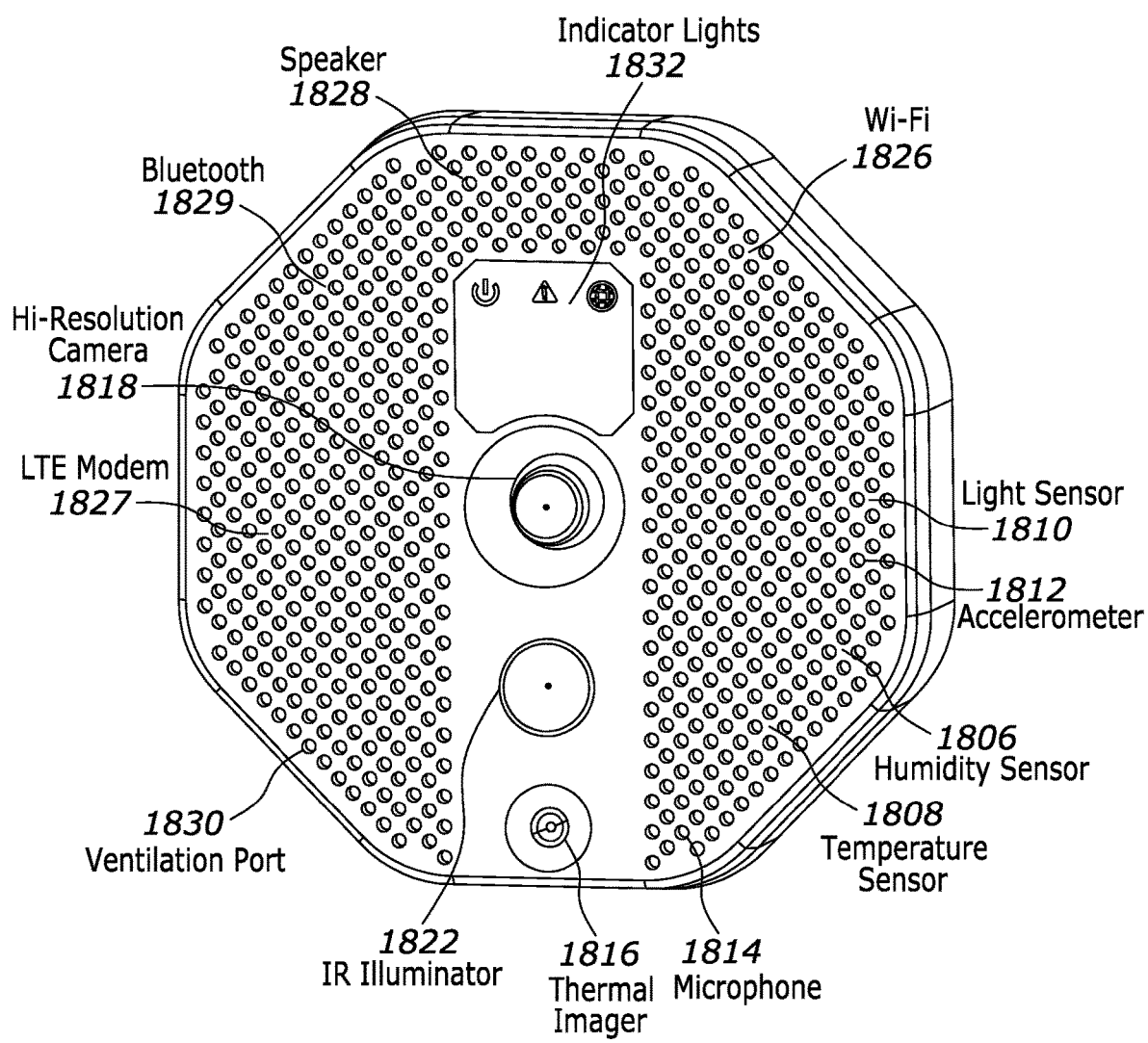
FIG. 18A illustrates an external perspective view depicting a front side of an example monitoring device.
Figure 18B:
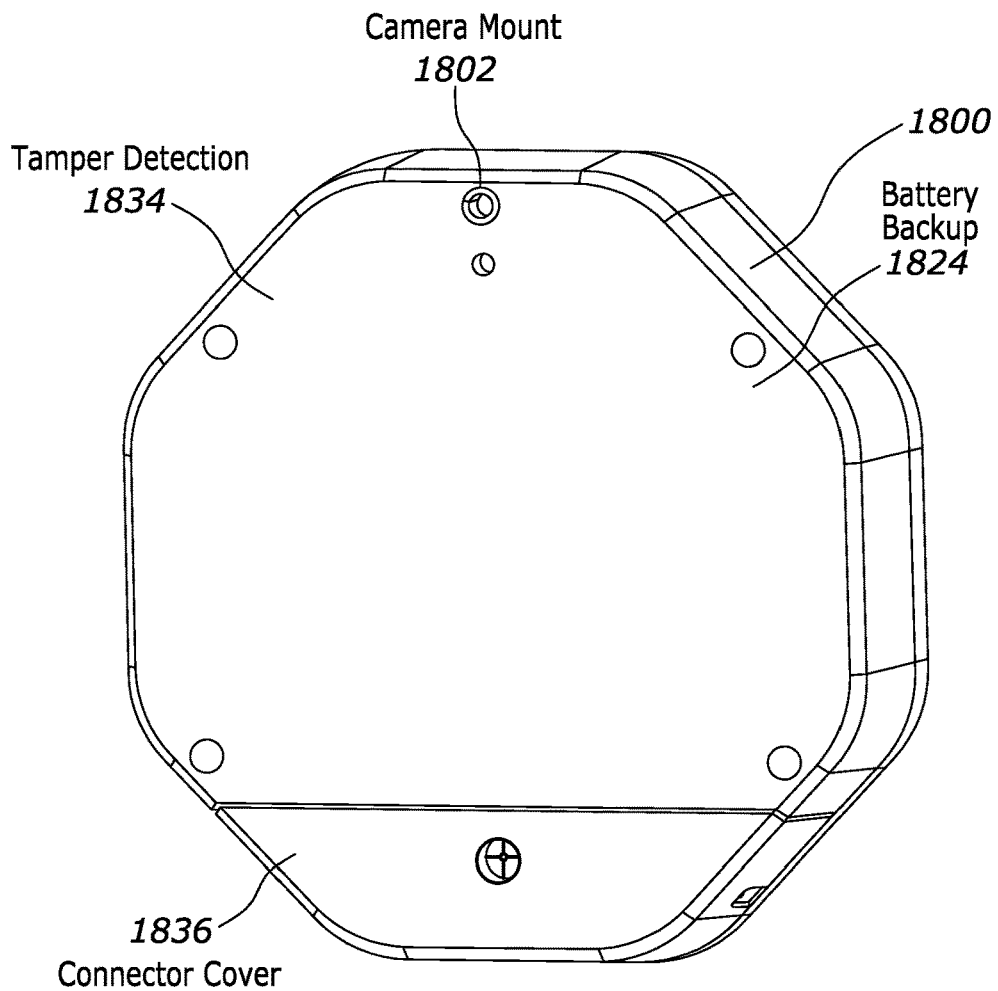
FIG. 18B illustrates an external perspective view depicting a back side of the example monitoring device shown in FIG. 18A.
Figure 18C:
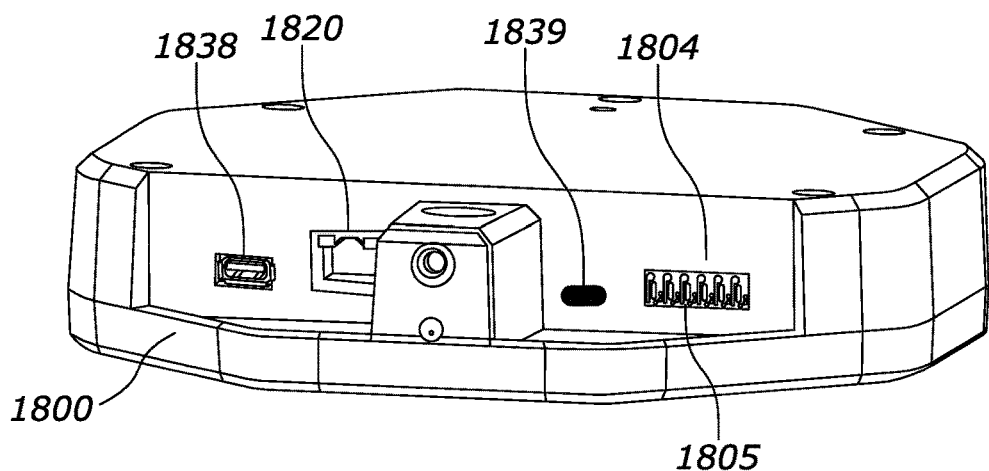
FIG. 18C illustrates an external perspective view depicting a bottom side of the example monitoring device shown in FIG. 18A.

FIGS. 18A, 18B, and 18C depict a front perspective view, a back perspective view, and a bottom perspective view, respectively, of an example embodiment of such a monitoring device 1800 having a single high-resolution camera 1818. The monitoring device 1800 preferably can be mounted on the ceiling, wall, floor, or other suitable surface, and can be oriented such that the device is perpendicular to the front of the equipment. In embodiments, the device 1800 can have a camera mount (e.g., ¼×20 screw fitting) 1802 for attaching to a suitable mounting bracket. In the case of a monitored room with a single equipment rack, one camera, such as high-resolution camera 1818, can provide a view of the rack and immediate area, or up to three racks in a typical server closet environment. In embodiments, the monitoring device 1800 can have more than one camera, such as, for example, four internal cameras, each 90° apart, giving a 360° field of view. The one or more cameras in the monitoring device can be oriented to cover the area of interest in the monitored room, which primarily can be the server racks, but can also be other equipment and room features, such as cabinet or rack doors, personnel entry doors, and/or windows. In embodiments, the monitoring device 1800 can have at least one camera with fixed focus, and at least another camera with variable (e.g., motorized) focus and/or zoom. Such a variable capability can be advantageous for asset recognition, for example, to better capture and decode a bar code image.

The camera angle, zoom and focus could be individually adjusted, either manually during installation or automatically. Each included camera may have a controlled infra-red (IR) filter to allow optimal video when light is present, or IR illuminated vision when the monitored room is dark. An IR illuminator can be located adjacent to each camera, or located elsewhere on the face of the monitoring device (such as IR illuminator 1822), and can be configured to perform different functions. The IR illuminator can act as a light source for the camera in IR mode. The IR illuminator can also be modulated with an identifier code to beacon a location to sensors with IR receivers. By so doing, the sensors can determine which beacon they are co-located with. Each sensor can then relay this identified location within a radio message.

In embodiments, the monitoring device can also include one or more thermal imagers, such as thermal imager 1816, which can provide a grid of thermal measurements based on Infrared emissions from surfaces. The monitoring device can then overlay the thermal image with images from the camera to correlate the corresponding temperature of individual equipment items within the field of view of the camera.

In embodiments, the monitoring device can include one or more radios and modems, such as Wi-Fi 1826, LTE (cellular) modem 1827, and Bluetooth 1829, and corresponding antennas to support radio communication via Wi-Fi, cellular (e.g., LTE, 5G), Bluetooth, and/or a sensor network radio, and can also include an Ethernet port, such as ethernet port 1820, to enable wired communication. Ethernet and Wi-Fi can serve as the primary communication paths to the edge-site local area network (LAN). The LAN can be the main edge-network or a network-management network. The monitoring device can use the LAN for functions including internet access, equipment monitoring via protocols such as SNMP, and for communication between devices. The monitoring device can use the cellular radio communication to connect to a WAN or cloud computing service when local network infrastructure is compromised.

In embodiments, power can be provided to the monitoring device through a power connector, and/or through a power-over-ethernet (POE) port, such as ethernet port 1820, to provide a PoE with battery backup capability 1824. Preferably the input power is sufficient to both operate the monitoring device and to charge an internal battery. If external power is compromised, the monitoring device can continue to operate using the internal battery.

In embodiments, the monitoring device can be configured with the capability to control room lighting using building automation protocols. Protocols can be via local direct wired or wireless connections, or by cloud services. Building automation protocols also provide a source for access and environmental information. The monitoring device can also have an integrated visible light source that can be controlled by the processor and illuminated only when video monitoring or analytics are required.

In embodiments, the monitoring device can include ventilation ports and grills, such as ventilation port 1830, to allow air flow into the device for colling, and for internal humidity, audio and temperature sensors, such as humidity sensor 1806, ambient temperature sensor 1808, ambient light sensor 1810, audio speaker 1828, and audio microphone 1814. Such a speaker can be used for issuing alarm sounds and for communicating verbal prompts to persons in the room. Such a microphone can be used to detect sounds that might indicate unusual activity for alarm purposes, as well as for communicating with persons in the room. In embodiments, the monitoring device can include an accelerometer or other motion sensor, such as accelerometer 1812, and other tamper detection sensors 1834, to detect unauthorized tampering or attempted removal of the monitoring device.

In embodiments, the monitoring device can also include dedicated input ports, such as door sensor port 1804 and fluid sensor port 1805, to provide for electrical connection to external door sensors, window sensors, glass breakage sensors, fluid sensors, and other similar devices. Such dedicated input ports, along with other physical ports such as internet port 1820, USB port 1838, and USB-C port 1839, can be protected by a removable connection cover 1836.

Figure 19:
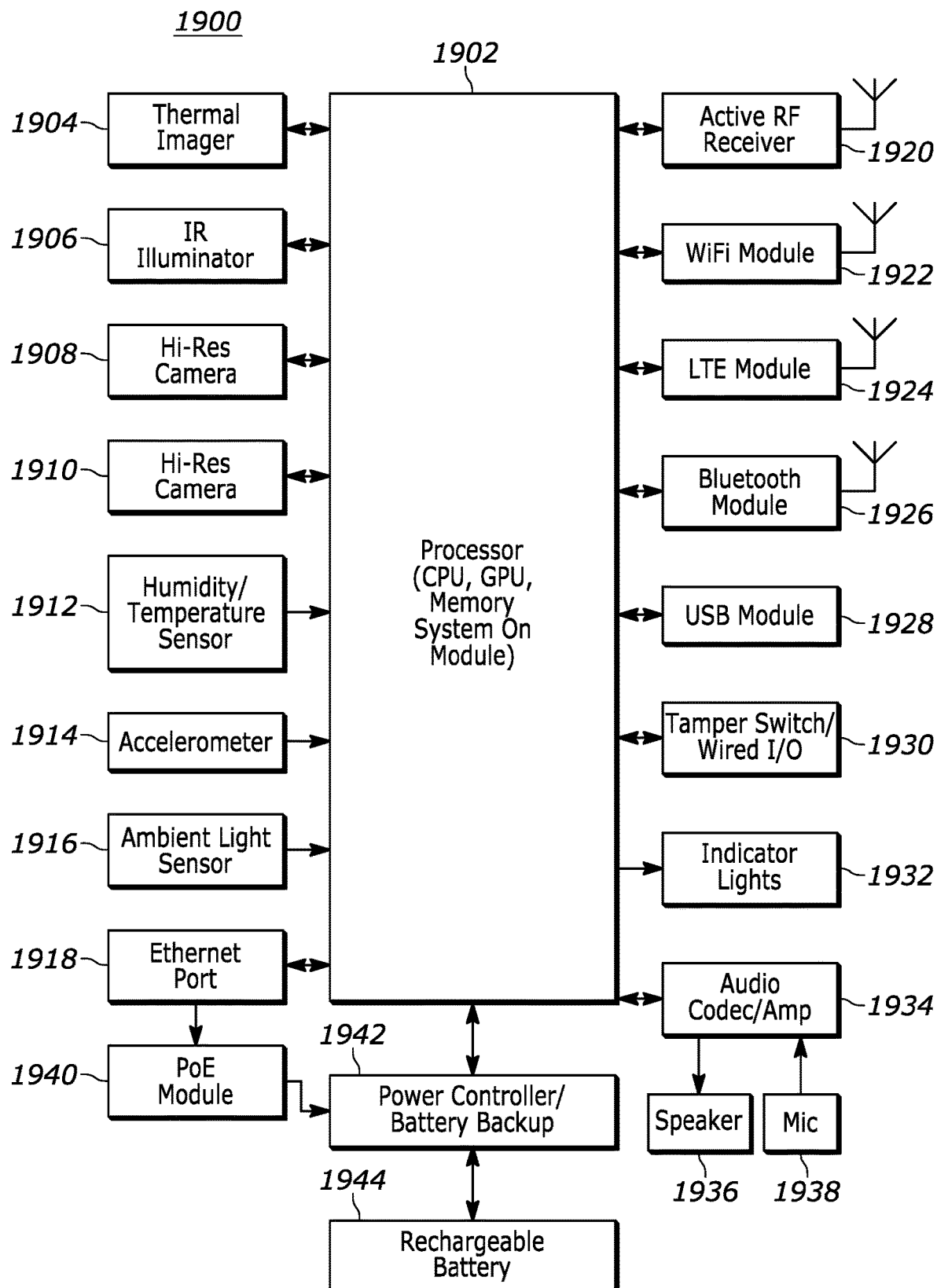
FIG. 19 illustrates a block diagram of another example monitoring device.

FIG. 19 shows a conceptual block diagram of an example monitoring device 1900. In embodiments, the device 1900 includes a processor 1902, and can include one or more high-resolution cameras 1908, 1910, to provide a view of the monitored area. In embodiments, the device 1900 can include an IR illuminator 1906 that can act as a light source for the cameras 1908, 1910 in IR mode.

In embodiments, the monitoring device can also include one or more thermal imagers, such as thermal imager 1904 which can provide a grid of thermal measurements based on Infrared emissions from surfaces. The monitoring device can then overlay the thermal image with images from the camera to correlate the corresponding temperature of individual equipment items within the field of view of the camera.

In embodiments, the monitoring device 1900 can include one or more radios and modems, such as active RF receiver 1920, Wi-Fi module 1922, LTE module 1924, and Bluetooth module 1926, and their corresponding antennas to support radio communication via Wi-Fi, cellular (e.g., LTE, 5G), Bluetooth, and/or a sensor network radio. In embodiments, the monitoring device 1900 can also include Ethernet port 1918 and one or more USB ports, such as via USB module 1928, to enable wired communication. Ethernet and Wi-Fi can serve as the primary communication paths to the edge-site local area network (LAN). The one or more USB ports can provide bidirectional communication and/or power. The LAN can be the main edge-network or a network-management network. The monitoring device can use the LAN for functions including internet access, equipment monitoring via protocols such as SNMP, and for communication between devices. The monitoring device can use the cellular radio communication to connect to a WAN or cloud computing service when local network infrastructure is compromised.

In embodiments, power can be provided to the monitoring device through a power connector, and/or through a power-over-ethernet (POE) port 1918 that is coupled to a POE module 1940. A rechargeable battery 1944 and the POE module 1940 can be coupled to a power controller/battery backup module 1942 to provide a PoE with battery backup capability for the monitoring device 1900.

In embodiments, the monitoring device 1900 can include a humidity and ambient temperature sensor 1912, and an ambient light sensor 1916, each coupled to the processor 1902, to provide awareness of the physical surroundings of device 1900. In embodiments, the monitoring device 1900 can include an audio speaker 1936, and an audio microphone 1938, which are both coupled to an audio CODEC/amplifier 1934, which in turn is coupled to the processor 1902. In embodiments, the monitoring device 1900 can include an accelerometer 1914 or other motion sensor, and tamper detection sensors within tamper switch/wired I/O module 1930, to detect unauthorized tampering or attempted removal of the monitoring device.

In embodiments, the monitoring device 1900 can also include dedicated input and output ports, such as within the tamper switch/wired I/O module 1930, to provide for electrical connection to external door sensors, window sensors, glass breakage sensors, fluid sensors, and other similar devices. In embodiments, the monitoring device 1900 can also include indicator lights module 1932, for interfacing with a variety of indicator lights, such as power, connection status, battery status, etc.

As can be appreciated by a skilled artisan, disclosed embodiments of a system can reliably and at low cost, track equipment presence, location within a rack, and rack identification, achieved with minimal thermal and mechanical impact in a system that can operate in real time or periodically as needed.

Definitions for other certain words and phrases are provided throughout this patent document. Those of ordinary skill in the art should understand that in many if not most instances, such definitions apply to prior as well as future uses of such defined words and phrases.

As used herein, the terms "barcode" and "barcode symbol" refer to any form of symbol optimized for machine readability. For example, this could include, without limitation, a conventional linear barcode (i.e., a one-dimensional barcode), a QR Code (i.e., a two-dimensional barcode), a Data Matrix Code (i.e., another two-dimensional barcode), or other symbol intended for machine scanning. The term "equipment rack" means any containing device having slots or positions into which an equipment item (or other type of asset) can be installed or mounted. The term "base layer" can refer to a single monolithic layer, and can refer to a multi-layer base layer.

For clarity, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Certain features that are, for clarity, described herein in the context of separate embodiments, may also be provided in combination in a single embodiment. Conversely, various features that are, for brevity, described in the context of a single embodiment, may also be provided separately or in any sub-combination. Further, references to values stated in ranges include each and every value within such ranges.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Note that not all of the activities described above in the general description or the examples are required, that a portion of a specific activity may not be required, and that one or more further activities may be performed in addition to those described. Still further, the order in which activities are listed are not necessarily the order in which they need be performed.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a door state using image analytics, said method comprising:
    capturing, using an imaging sensor, an image that includes a view of a doorway having a frame and a door and having a pair of tracking strips associated with said doorway, one tracking strip of said pair being attached to the door, and the other tracking strip of the pair being fixed to the frame, each of said pair of tracking strips being of a length greater than a width;
    detecting in the image, using a processor, at least one of the pair of tracking strips associated with the doorway;
    determining, using the processor, a lengthwise vector of each detected tracking strip;
    setting the door state to closed if only one of the pair of tracking strips is detected, or if both tracking strips of the pair are detected and their respective lengthwise vectors are substantially parallel; and
    setting the door state to open if both tracking strips of the pair are detected and their respective lengthwise vectors are substantially non-parallel.

2. The method as in claim 1, wherein
the pair of tracking strips have a color that contrasts with a dominant background color surrounding the pair of tracking strips.

3. The method as in claim 2, wherein
the pair of tracking strips have a reflective surface.

4. The method as in claim 2, wherein
the color of the pair of tracking strips is green.

5. The method as in claim 1, wherein
each of the pair of tracking strips includes an identifying bar code.

6. The method as in claim 5, wherein
the respective identifying bar codes for the pair of tracking strips are identical.

7. The method as in claim 6, wherein
the identical identifying bar code identifies the doorway.

8. The method as in claim 1, further comprising:
illuminating the doorway using an infra-red light source;
wherein the imaging sensor comprises an infra-red camera; and
wherein the pair of tracking strips have a reflective surface.

9. The method as in claim 1, wherein
the length of each tracking strip is approximately one-half that of a door captured in the image having the narrowest width.

10. The method as in claim 1, wherein
the lengthwise vector comprises a lengthwise center axis.

11. The method as in claim 1, further comprising
estimating a door angle using the lengthwise vector of each tracking strip.

12. The method as in claim 1, wherein said detecting comprises:
converting the image to a hue-saturation-value (HSV) color space;
applying a filter corresponding to color or reflectivity of the pair of tracking strips to isolate each tracking strip within the HSV image; and
applying a live detection algorithm to identify the lengthwise vector of each detected tracking strip.

13. The method as in claim 1, further comprising:
performing a training phase by manipulating the door and any additional door captured in the image through its range of movement, and detecting for each door a corresponding limit of motion.

14. A system for monitoring a door state of at least one doorway, said system comprising:
    a first pair of tracking strips associated with a first doorway, one tracking strip of said first pair being attached to a door of the first doorway, and the other tracking strip of the first pair being fixed to a frame of the first doorway, each of said first pair of tracking strips being of a length greater than a width;

a camera configured to capture an image that includes a view of the first pair of tracking strips associated with the first doorway;

a processor adapted and configured to:
- detect in the image at least one of the first pair of tracking strips associated with the first doorway;
- determine a lengthwise vector of each detected tracking strip;
- set the door state to closed if only one of the first pair of tracking strips is detected, or if both tracking strips of the first pair are detected and their respective lengthwise vectors are substantially parallel; and
- set the door state to open if both tracking strips of the first pair are detected and their respective lengthwise vectors are substantially non-parallel.

15. The system as in claim 14, wherein
the first pair of tracking strips have a color that contrasts with a dominant background color surrounding the first pair of tracking strips.

16. The system as in claim 15, wherein
the first pair of tracking strips have a reflective surface.

17. The system as in claim 15, wherein
the color of the first pair of tracking strips is green.

18. The system as in claim 14, wherein
each of the first pair of tracking strips includes an identifying bar code.

19. The system as in claim 18, wherein
the respective identifying bar codes for the first pair of tracking strips are identical.

20. The system as in claim 19, wherein
the identical identifying bar code identifies the first doorway.

21. The system as in claim 14, further comprising an infra-red light source configured to illuminate the first doorway, and:
- wherein the camera comprises an infra-red camera; and
- wherein the first pair of tracking strips have a reflective surface.

22. The system as in claim 14, wherein
the length of each tracking strip is approximately one-half that of a door captured in the image having the narrowest width.

23. The system as in claim 14, wherein
the lengthwise vector comprises a lengthwise center axis.

24. The system as in claim 14, wherein the processor is further adapted and configured to estimate a door angle using the lengthwise vector of each tracking strip.

25. The system as in claim 14, wherein the processor is further adapted and configured to:
- convert the image to a hue-saturation-value (HSV) color space;
- apply a filter corresponding to color or reflectivity of the first pair of tracking strips to isolate each tracking strip within the HSV image; and
- apply a live detection algorithm to identify the lengthwise vector of each detected tracking strip.

* * * * *